(12) United States Patent
Sakuda et al.

(10) Patent No.: US 12,665,194 B2
(45) Date of Patent: Jun. 23, 2026

(54) SOLID SOLUTION, ELECTRODE ACTIVE MATERIAL, ELECTRODE AND SECONDARY BATTERY

(71) Applicant: UNIVERSITY PUBLIC CORPORATION OSAKA, Osaka (JP)

(72) Inventors: Atsushi Sakuda, Sakai (JP); Yusuke Kawasaki, Sakai (JP); Akitoshi Hayashi, Sakai (JP); Masahiro Tatsumisago, Sakai (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 793 days.

(21) Appl. No.: 17/908,676

(22) PCT Filed: Mar. 3, 2021

(86) PCT No.: PCT/JP2021/008207
§ 371 (c)(1),
(2) Date: Sep. 1, 2022

(87) PCT Pub. No.: WO2021/177355
PCT Pub. Date: Sep. 10, 2021

(65) Prior Publication Data
US 2023/0100540 A1 Mar. 30, 2023

(30) Foreign Application Priority Data
Mar. 6, 2020 (JP) ................................. 2020-038835

(51) Int. Cl.
H01M 4/58 (2010.01)
H01M 4/02 (2006.01)
H01M 10/0562 (2010.01)

(52) U.S. Cl.
CPC ..... *H01M 4/5815* (2013.01); *H01M 10/0562* (2013.01); *H01M 2004/021* (2013.01); *H01M 2300/0068* (2013.01)

(58) Field of Classification Search
CPC ...... H01M 4/136; H01M 4/581; H01M 4/582; H01M 4/5815; H01M 10/0562
See application file for complete search history.

(56) References Cited

U.S. PATENT DOCUMENTS

2015/0372304 A1 12/2015 Hasegawa et al.
2017/0317337 A1 11/2017 Hayashi et al.
2020/0087155 A1* 3/2020 Rupert ................ H01M 10/052

FOREIGN PATENT DOCUMENTS

CN 105103343 A 11/2015
JP 2010-100500 A 5/2010
(Continued)

OTHER PUBLICATIONS

Lou Gaixia et al., Study on Li2S performance cathode material lithium-sulfur battery, Journal of Hunan City University (Natural Science), Sep. 2015, vol. 24, No. 3, p. 112-113.
(Continued)

*Primary Examiner* — Allison Bourke
*Assistant Examiner* — Travis L. Martin
(74) *Attorney, Agent, or Firm* — Stites & Harbison, PLLC; Jeffrey A. Haeberlin; Trevor T. Graves

(57) ABSTRACT
An object is to provide an electrode active material having a novel structure, said electrode active material enabling $Li_2S$ to be used as an electrode. The problem is solved by a solid solution with an antifluorite crystal structure comprising Li, Cu, and S as main constituents.

18 Claims, 22 Drawing Sheets

(56) References Cited

FOREIGN PATENT DOCUMENTS

| | | |
|---|---|---|
| JP | 2014-056755 A | 3/2014 |
| WO | 2016/063877 A1 | 4/2016 |

OTHER PUBLICATIONS

Lou Gai-xia et al., Ni doped lithium battery cathode material Li2S performance study, Journal of Hunan City University (Natural Science), Dec. 2015, vol. 24, No. 4, p. 98-99.

Beleanu, A., et al. LiCuS, an intermediate phase in the electrochemical conversion reaction of CuS with Li: A potential environment-friendly battery and solar cell material. Solid State Sciences 55 (2016) 83-87.

Hayashi, et al., "Preparation of amorphous Li3VS4 positive electrodes by mechanical milling and their application to all-solid-state lithium batteries (Summary)", The 97th Annual Meeting of The Chemical Society of Japan. See: Specification.

Chen, Erica M. et al., Thermal and electrochemical behavior of Cu4-xLixS2 (x=1,2,3) phases, Journal of Solid State Chemistry, 2015, vol. 232, p. 8-13. See: ISR.

Japan Patent Office, International Search Report in International Stage Application No. PCT/JP2021/008207, mailed May 11, 2021.

* cited by examiner

10 μm          Cu L

10 μm          S K 3.0 μm         IMG1

3.0 µm

SOLID SOLUTION, ELECTRODE ACTIVE MATERIAL, ELECTRODE AND SECONDARY BATTERY

TECHNICAL FIELD

The present invention relates to a solid solution, an electrode active material, an electrode, an electrode composite, and a secondary battery. More particularly, the present invention relates to a new solid solution with an antifluorite crystal structure, and an electrode active material, an electrode, an electrode composite, and a secondary battery including the solid solution.

BACKGROUND ART

In recent years, there has been an increasing demand for lithium-ion secondary batteries for storing electric power in vehicles, such as electric vehicles and hybrid vehicles, and power generation apparatus, such as solar batteries and wind power generators.

Further, from the viewpoint of ensuring safety, all-solid-state batteries, which use a solid electrolyte layer instead of a liquid electrolyte layer, have been actively studied.

These lithium-ion secondary batteries and all-solid-state batteries are required to have higher performance. Of these, $Li_2S$ is attracting attention as a material for an electrode active material that constitutes an electrode.

Since $Li_2S$ has a high theoretical capacity of 1167 mAh $g^{-1}$, it is expected as a next-generation electrode active material. However, $Li_2S$ has a very low electric conductivity of $10^{-9}$ S cm$^{-1}$ or less, and cannot be used as an electrode active material by itself.

Attempts have been made to utilize $Li_2S$, and for example, WO2016/063877 (Patent Literature 1) discloses a solid solution obtained by treating $Li_2S$ mixed with LiI or LiBr. In addition, Hayashi, Tatsumisago, et al. Annual Meeting of the Chemical Society of Japan. (2017) (Non-Patent Literature 1) discloses a positive electrode active material obtained by adding and mixing $V_2S_3$ and S into $Li_2S$.

CITATION LIST

Patent Literature

[PL1] International Publication No. WO2016/063877

Non-Patent Literature

[NPL1] Hayashi, Tatsumisago, et al. Annual Meeting of the Chemical Society of Japan. (2017)

SUMMARY OF INVENTION

Technical Problem

Although an electrode active material utilizing $Li_2S$ in accordance with the above-mentioned method has been developed, there has been a need to develop a new electrode active material using $Li_2S$ for further improvement in performance.

Solution to Problem

As a result of intensive studies, the inventors of the present invention have found that a solid solution including Li, Cu, and S as main constituents unexpectedly has an antifluorite structure. They also have found that this solid solution has high electronic conductivity and have excellent effects on electrode characteristics and secondary battery characteristics when used as an electrode active material, and thereby arrived at the present invention.

According to the present invention, there is provided a solid solution with an antifluorite crystal structure including Li, Cu, and S as main constituents.

Also, according to the present invention, there is provided an electrode active material including the solid solution.

Further, according to the present invention, there is provided an electrode including the electrode active material.

Further, according to the present invention, there is provided an electrode composite wherein the electrode is combined with a current collector.

Further, according to the present invention, there is provided a secondary battery including the electrode or the electrode composite.

Advantageous Effects of Invention

According to the present invention, a novel Li-containing metal sulfide-based solid solution is provided.

Also, when a solid solution has any one of the following structures, a solid solution having higher electronic conductivity and/or excellent charge/discharge capacity can be provided.

(1) The solid solution is represented by the following formula:

$$Li_{4-x-y-z}Cu_{x-y}M_yS_{2-z}A_z \tag{1}$$

(where M is a divalent metal cation, A is a monovalent anion, x is 0.1 or more and 2.0 or less, y is 0 or more and less than 1.0, z is 0 or more and 1.0 or less, and x>y).

(2) In the above formula, M is selected from Cu, Mg, Ca, Ni, Zn, Fe, Co, Sn, Pb, or Mn.

(3) In the above formula, A is selected from F, Cl, Br, or I.

(4) The lattice constant of the a-axis of the solid solution is in the range of 5.60 Å to 5.80 Å.

DESCRIPTION OF EMBODIMENTS (Solid Solution)

The solid solution of the present invention has an antifluorite crystal structure including Li, Cu, and S as main constituents. The solid solution herein is the same as what is generally recognized as a solid solution by a person skilled in the art, and refers to a solid solution in which two or more kinds of elements are dissolved into each other to have a homogeneous state.

Figure 1:
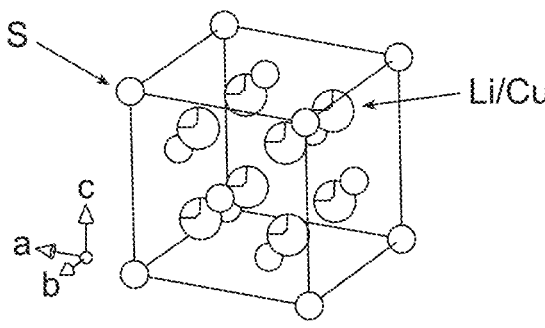
FIG. 1 is a schematic diagram of an antifluorite crystal structure of a solid solution of the present invention.

The antifluorite crystal structure is a tetrahedron of a face-centered cubic lattice composed of negatively charged anions, with positively charged cations in the centers of eight small cubes obtained by cutting each side of the tetrahedron to half the length. The antifluorite crystal structure of the solid solution of the present invention is shown in FIG. 1. As shown in FIG. 1, the solid solution of the present invention has a structure in which some Li in $Li_2S$ is substituted by Cu. Showing a structure in which part of $Li_2S$ is substituted by Cu was first found by the inventors. Since some Li in $Li_2S$ is substituted by Cu, the solid solution of the present invention exhibits high conductivity which cannot be obtained with $Li_2S$ alone. The inventors believe that this substitution is performed in a disorderly manner regardless of the position of Li. The solid solution may have a structure of a $Li_2S$—$Cu_2S$-based solid solution in which a region represented by $Li_2S$ and a region which can also be represented by $Cu_2S$ are mixed.

The phrase "including . . . as main constituents" means that the total molar content of Li, Cu, and S in the solid solution is 50% or more of the total molar content of the solid solution. This is preferably 60% or more, more preferably 70% or more, even more preferably 80% or more, particularly preferably 90% or more, and particularly more preferably 95% or more.

The solid solution of the present invention may further include divalent and/or trivalent metal cations and/or monovalent anions in addition to Li, Cu, and S. Here, the metal cations are not limited, but are preferably selected from metal cations of periods 3 to 5, and more preferably selected from metal cations of periods 3 to 4, for example. Also, the metal cations are preferably selected from metal cations of groups 2 to 14, more preferably selected from metal cations of groups 2 and 6 to 14, even more preferably selected from metal cations of groups 2 and 7 to 14, and even more preferably selected from metal cations of groups 2 and 7 to 12. Further, the metal cations are preferably selected from metal cations of periods 3 to 5 and groups 2 to 14, and more preferably selected from metal cations of periods 3 to 4 and groups 2 and 7-12. The metal cations may be a single kind of metal cation or a combination of multiple kinds of metal cations.

The anions are not particularly limited, and examples thereof include an anion of group 17. The anion of group 17 is preferably selected from F, Cl, Br, or I.

The anions may be a single kind of anion or a combination of multiple kinds of monovalent anions.

The inclusion of metal cations selected from metal cations of periods 3 to 5 and groups 2 to 14 and/or monovalent anions makes it possible to provide a solid solution with better electric conductivity.

In a specific embodiment, the solid solution of the present invention can be represented by, for example, the following formula:

$$Li_{4-x-y(1)-2y(2)-z}Cu_{x-y(1)-y(2)}M(II)_{y(1)}M(III)_{y(2)}S_{2-z}A_z \qquad (2)$$

(where M(II) is a divalent metal cation, M(III) is a trivalent metal cation, A is a monovalent anion, x is 0.1 or more and 2.0 or less, y(1)+y(2) is 0 or more and less than 1, z is 0 or more and 1.0 or less, and x>y(1)+y(2)).

M(II) is not particularly limited as long as it is a divalent metal cation, but a divalent metal cation selected from the above-mentioned metal cations is preferable. The divalent metal cation can be selected from, for example, Cu, Mg, Ca, Ni, Zn, Fe, Co, Sn, Pb, or Mn. M(II) may be a single kind of divalent metal cation or a combination of multiple kinds of divalent metal cations.

M(III) is not particularly limited as long as it is a trivalent metal cation, but a trivalent metal cation selected from the above-mentioned metal cations is preferable. The trivalent metal cation can be selected from, for example, Al, Fe, or Cr. M(III) may be a single kind of trivalent metal cation or a combination of multiple kinds of trivalent metal cations.

A is not particularly limited as long as it is a monovalent anion, but for example, an anion of group 17 is preferable. The monovalent anion may be, for example, a halogen such as F, Cl, Br, or I. A may be a single kind of monovalent anion or a combination of multiple kinds of monovalent anions.

x in the formula can take any value of 0.1 or more and 2.0 or less, for example. The range of x can be, for example, a range defined by any combination of upper and lower limits selected from the values of 2.0, 1.9, 1.8, 1.7, 1.6, 1.5, 1.4, 1.3, 1.2, 1.1, 1.0, 0.95, 0.9, 0.85, 0.8, 0.75, 0.7, 0.65, 0.6, 0.55, 0.5, 0.45, 0.4, 0.35, 0.3, 0.25, 0.2, 0.15, and 0.10. Among these, x is preferably in the range of 0.5 to 1.0. By having x fall in the range of 0.5 to 1.0, a solid solution with better electric conductivity can be provided.

y(1) and y(2) are any values satisfying 0≤y(1)+y(2)<1 and y(1)+y(2)<x. y(1) and y(2) are preferably values satisfying y(1)+y(2)≤0.5x.

y(1) in the formula can take any value of 0 or more and 0.5 or less, for example. The range of y(1) may be, for example, a range defined by any combination of upper and lower limits selected from the values of 0.5, 0.45, 0.4, 0.35, 0.3, 0.25, 0.2, 0.15, 0.10, 0.05, 0.01, and 0.

y(2) in the formula can take any value of 0 or more and 0.5 or less, for example. The range of y(2) may be, for example, a range defined by any combination of upper and lower limits selected from the values of 0.5, 0.45, 0.4, 0.35, 0.3, 0.25, 0.2, 0.15, 0.10, 0.05, 0.01, and 0.

z in the formula can take any value of 0 or more and 1.0 or less, for example. The range of z can be, for example, a range defined by any combination of upper and lower limits selected from the values of 1.0, 0.95, 0.9, 0.85, 0.8, 0.75, 0.7, 0.65, 0.6, 0.55, 0.5, 0.45, 0.4, 0.35, 0.3, 0.25, 0.2, 0.15, 0.10, 0.05, 0.01, and 0. Among these, z is preferably in the range of 0 to 0.5, more preferably in the range of 0 to 0.4, even more preferably in the range of 0 to 0.3, and even more preferably in the range of 0 to 0.2. It is also preferable that z s x. By having z fall in the range of 0 to 0.5, the charge/discharge capacity can be further improved.

In a more specific embodiment, the solid solution of the present invention can be represented by the following formula:

$$Li_{4-x-y-z}Cu_{x-y}M_yS_{2-z}A_z \qquad (1)$$

(where M is a divalent metal cation, A is a monovalent anion, x is 0.1 or more and 2.0 or less, y is 0 or more and less than 1.0, z is 0 or more and 1.0 or less, and x>y).

As M in formula (1), the same divalent metal cation as M(II) in formula (2) above can be used.

As A in formula (1), the same monovalent anion as A in formula (2) above can be used.

x and z in formula (1) are also the same as x and z in formula (2).

y in formula (1) can take any value of 0 or more and less than 1.0, for example. The range of y can be, for example, a range defined by any combination of upper and lower limits selected from the values of 0.99, 0.95, 0.9, 0.85, 0.8, 0.75, 0.7, 0.65, 0.6, 0.55, 0.5, 0.45, 0.4, 0.35, 0.3, 0.25, 0.2, 0.15, 0.10, 0.05, 0.01, and 0. Among these, y is preferably in the range of 0 to 0.5, more preferably in the range of 0 to 0.4, even more preferably in the range of 0 to 0.3, and even more preferably in the range of 0 to 0.2. It is also preferable that y≤0.5x. By having y fall in the range of 0 to 0.5, the charge/discharge capacity can be further improved.

Including a divalent metal cation or a monovalent anion in the antifluorite crystal structure of the solid solution as shown in the above formula can cause defects in a part of the crystal structure and thereby further improve conductivity.

The solid solution of the present invention can be represented by, for example, $Li_3CuS_2$, $Li_5CuS_3$, $Li_8Cu_2S_5$, or $Li_7CuS_4$ when x is in the range of 0.5 to 1.0, and y=0 and z=0.

It is preferable that the lattice constant of the solid solution of the present invention is in the range of 5.60 Å to 5.80 Å, which is calculated by Fox software (vincefn) or the like based on the real space method on the basis of an XRD pattern obtained by measuring CuKα of the solid solution as the X-ray source as well as a space group (Fm$\overline{3}$m)

and lattice constant (a=5.76 Å) of $Li_2S$. It is more preferable that it is in the range of 5.65 Å to 5.75 Å. It is preferable that the solid solution has a lattice constant in this range from the viewpoint of higher capacity and higher output.

The solid solution of the present invention preferably has an electronic conductivity of $1.0\times10^{-6}$ S cm$^{-1}$ or more. Since the solid solution has an electronic conductivity of $1.0\times10^{-6}$ S cm$^{-1}$ or more, a secondary battery excellent in performance such as charge/discharge capacity can be manufactured. The solid solution of the present invention more preferably has an electronic conductivity of $1.0\times10^{-4}$ S cm$^{-1}$ or more, even more preferably has an electronic conductivity of $1.0\times10^{-3}$ S cm$^{-1}$ or more, and particularly preferably has an electronic conductivity of $5.0\times10^{-3}$ S cm$^{-1}$ or more. Since the solid solution has the above-mentioned electronic conductivity, the solid solution of the present invention can be used as an electrode without addition of a conductive assistant.

The solid solution of the present invention preferably has an ionic conductivity of $1.0\times10^{-8}$ S cm$^{-1}$ or more. Since the solid solution has an ionic conductivity of $1.0\times10^{-8}$ S cm$^{-1}$ or more, a secondary battery excellent in performance such as charge/discharge capacity can be manufactured. The solid solution of the present invention more preferably has an ionic conductivity of $1.0\times10^{-7}$ S cm$^{-1}$ or more, even more preferably has an ionic conductivity of $1.0\times10^{-6}$ S cm$^{-1}$ or more, and particularly preferably has an electronic conductivity of $3.0\times10^{-6}$ S cm$^{-1}$ or more. Since the solid solution has the above-mentioned ionic conductivity, the solid solution of the present invention can be used as an electrode without addition of a solid electrolyte.

(Method for Producing Solid Solution)

The method for producing the solid solution is not particularly limited as long as it is a method capable of producing an antifluorite solid solution including all the elements of Li, Cu, and S by combining raw materials including at least one element of Li, Cu, and S. Examples of the raw materials including at least one element of Li, Cu, and S include Li alone, $Li_2S$, Cu alone, S alone, and CuS. S may be cyclic sulfur such as $S_8$ or chain S. In addition to the above-mentioned raw materials including at least one element of Li, Cu, and S, a raw material including a divalent metal cation, a trivalent metal cation and/or a monovalent anion as described above may also be added.

The method for forming a solid solution is not particularly limited, but for example, mechanochemical treatment can be used because it allows homogeneous reaction.

As the treatment apparatus, a ball mill can be used. Ball mills are preferable because large mechanical energy can be obtained. Among ball mills, a planetary ball mill is preferable because the pot rotates on its own axis and the base plate revolves in the opposite direction to the rotation so that high impact energy can be efficiently generated.

The treatment conditions can be appropriately set in accordance with the treatment apparatus to be used. For example, when a planetary ball mill is used, examples of the conditions include a rotation speed of 160 to 400 rotations per minute and a processing time of 0.1 to 120 hours. When lithium salt is used as a raw material, in order to prevent the lithium salt from reacting with water and/or oxygen, it is preferable that the treatment is performed within a glove box or the like in an inert atmosphere (for example, an argon atmosphere) having a moisture concentration of 1000 ppm or less and an oxygen concentration of 1000 ppm or less.

As an example of the method for producing the antifluorite solid solution including Li, Cu, and S as main constituents, the solid solution can be obtained by adding and mixing Cu alone and S alone into $Li_2S$ in an argon atmosphere and subjecting the mixture to mechanochemical treatment.

(Electrode Active Material)

The electrode active material of the present invention may consist only of the solid solution of the present invention. The solid solution of the present invention has high ionic conductivity and electronic conductivity by itself. Therefore, the amount of the solid solution in the electrode active material can be increased. However, this does not mean that the electrode active material should not include a substance other than the solid solution, and may include any solid electrolyte, binder, or conductive agent to be described later.

The amount of the solid electrolyte included in the electrode active material is not particularly limited, but is preferably 0 to 200 parts by weight with respect to 100 parts by weight of the solid solution in the electrode active material. If the amount is more than 200 parts by weight, the positive electrode using the electrode active material may not function as a positive electrode. The amount of the solid electrolyte is preferably 0 to 100 parts by weight with respect to 100 parts by weight of the solid solution in the electrode active material.

(Electrode)

The electrode of the present invention includes the solid solution of the present invention or the electrode active material of the present invention. The electrode of the present invention may be made of only the solid solution of the present invention or the electrode active material of the present invention, or may be a mixture of the solid solution or the electrode active material with a binder, a conductive material, an electrolyte, or the like. The solid solution of the present invention or the electrode active material of the present invention has sufficiently high ionic conductivity and electronic conductivity by itself. Therefore, the amount of the solid electrolyte and/or conductive material included in the conventional electrode can be reduced, or there may be no solid electrolyte or conductive material. The percentage of the electrode active material in the electrode can be 70 mass % or more, 85 mass % or more, or 100 mass %. However, the use of a solid electrolyte and/or a conductive material is not excluded, and these may be used as necessary.

The solid solution of the present invention or the electrode active material of the present invention can be used as either a positive electrode or a negative electrode depending on the combination with the electrode to be paired with.

The binder is not particularly limited, and examples of the binder include polyvinylidene fluoride, polytetrafluoroethylene, polyvinyl alcohol, polyvinyl acetate, polymethyl methacrylate, polyethylene, styrene butadiene rubber, acrylonitrile butadiene rubber, copolymers thereof, and the like. When the binder and the solid solution of the present invention are mixed using a solvent, the solvent is preferably, but not particularly limited to, a solvent which does not cause a side reaction with the solid solution of the present invention.

The conductive material is not particularly limited, and examples of the conductive material include natural graphite, artificial graphite, acetylene black, Ketchen black, Denka black, carbon black, vapor-grown carbon fiber (VCGF), and the like.

The solid electrolyte included in the electrode is not particularly limited, and a solid electrolyte used in preparing a secondary battery to be described later can be used.

A known electrode active material may be added to the electrode of the present invention as necessary. Examples of the known electrode active material include, for example, $Li_4Ti_5O_{12}$, $LiCoO_2$, $LiMnO_2$, $LiVO_2$, $LiCrO_2$, $LiNiO_2$, $Li_2NiMn_3O_8$, $LiNi_{1/3}Co_{1/3}Mn_{1/3}O_2$, FeS, $Ti_2S$, $LiFeO_2$, $Li_3V_2(PO_4)_3$, $LiMn_2O_4$, and the like when the electrode is a positive electrode. When the electrode is a negative electrode, examples of the negative electrode active material include natural graphite, artificial graphite, acetylene black, Ketchen black, Denka black, carbon-based materials such as carbon black and VCGF, Si, Li alloys, Na alloys, metals such as Au, Pt, Pd, Ag, Al, Bi, Sn, Sb, Zn, Mg, K, Ca and Na, various transition metal oxides such as $Li_{4/3}Ti_{5/3}O_4$, $Li_3V_2(PO_4)_3$, and SnO, and the like. These negative electrode active materials may be used alone or in combination of two or more.

The electrode may be coated with a material such as $LiNbO_3$, $NaNbO_3$, $Al_2O_3$, or NiS. These electrodes may be used alone or in combination of two or more.

The electrode can be obtained in the form of a pellet by, for example, pressing an electrode active material, optionally mixed with a binder, a conductive material, an electrolyte, or the like.

(Electrode Composite)

The present invention also provides an electrode composite in which a positive electrode and a current collector are combined. The electrode to be combined with the current collector is the electrode of the present invention described above.

The material, shape, and the like of the current collector are not particularly limited as long as the current collector can be combined with the electrode of the present invention and can function as a current collector. The shape of the current collector may be like an even alloy plate or a shape having a hole. The current collector may also be in the form of a foil, a sheet, or a film.

Examples of the material of the current collector include Ni, Cu, Ti, Fe, Co, Ge, Cr, Mo, W, stainless steel, steel, and the like.

In addition to the above materials, the current collector may be coated with gold or aluminum. The thickness of the coating is not particularly limited, but is preferably 10 nm to 100 μm. Also, the coating preferably has an even thickness.

The coating method is not particularly limited as long as the current collector can be coated, but the coating can be formed by vapor deposition on the surface using a sputter coater, for example.

The electrode composite of the present invention may be formed by combining parts formed as an electrode and a current collector, respectively, or by directly forming an electrode on a current collector. In the case of the direct formation, an electrode active material may be applied to the surface of the current collector using a known method.

(Secondary Battery)

The present invention provides a secondary battery including the electrode or electrode composite of the present invention. The secondary battery may be a general lithium ion secondary battery or an all-solid-state secondary battery.

The electrode of the present invention can be used as either a positive electrode or a negative electrode.

When the electrode of the present invention is used as a positive electrode, the positive electrode is not particularly limited as long as Li can be exchanged as a mobile ion between the positive electrode and the negative electrode during charging and discharging, and the positive electrode may be used in combination with a known negative electrode. The known negative electrode preferably has a low redox potential, and more preferably has an average charge/discharge potential of 0.7 V or less with respect to the redox potential of Li. When the electrode of the present invention is used as a negative electrode, the negative electrode is not particularly limited as long as Li can be exchanged as a mobile ion between the positive electrode and the negative electrode during charging and discharging, and the negative electrode may be used in combination with a known positive electrode. The known positive electrode preferably has a high redox potential, and more preferably has an average charge/discharge potential of 3.5 V or more with respect to the redox potential of Li. The positive electrode active material used for the known positive electrode and the known negative electrode is composed of the above-described known positive electrode active material or the like. The known positive electrode and negative electrode may be made of only an electrode active material, or may be a mixture of an electrode active material with a binder, a conductive material, an electrolyte, or the like.

The electrolyte layer used in the secondary battery can be roughly divided into a type composed mainly of an electrolytic solution and a type composed of a solid electrolyte.

(1) Nonaqueous Electrolyte Layer

The nonaqueous electrolyte layer used in the present invention can be composed of a mixture of a known electrolyte and a nonaqueous solvent.

Examples of the electrolyte include $LiClO_4$, $LiPF_6$, $LiBF_4$, $LiCF_3SO_3$, $LiAsF_6$, $LiB(C_6Hs)_4$, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, $LiN(SO_3CF_3)_2$, and the like.

The nonaqueous solvent is not particularly limited, and examples thereof include carbonates, ethers, ketones, sulfolane compounds, lactones, nitriles, chlorinated hydrocarbons, amines, esters, amides, phosphoric acid ester compounds, and the like. Typical examples of these are 1,2-dimethoxyethane, 1,2-diethoxyethane, tetrahydrofuran, 2-methyltetrahydrofuran, ethylene carbonate, vinylene carbonate, methylformate, dimethylsulfoxide, propylene carbonate, acetonitrile, γ-butyrolactone, dimethylformamide, dimethyl carbonate, diethyl carbonate, sulfolane, ethylmethyl carbonate, 1,4-dioxane, 4-methyl-2-pentanone, 1,3-dioxolane, 4-methyl-1,3-dioxolane, diethyl ether, sulfolane, methyl sulfolane, propionitrile, benzonitrile, butyronitrile, valeronitrile, 1,2-dichloroethane, trimethyl phosphate, triethyl phosphate, and the like. These can be used alone or in combination of two or more.

(2) Solid Electrolyte Layer

The solid electrolyte constituting the solid electrolyte layer is not particularly limited, and a known solid electrolyte that can be used in all-solid-state secondary batteries can be used. The solid electrolyte is composed of, for example, a sulfide-based solid electrolyte material or an oxide-based solid electrolyte material.

Examples of the sulfide-based solid electrolyte material include $Li_2S$—$P_2S_5$, $Li_2S$—$P_2S_5$—LiI, $Li_2S$—$P_2S_5$—LiI—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$GeS_2$, LiI—$Li_2S$—$P_2O_5$, LiI—$Li_3PO_4$—$P_2S_5$, $Li_2S$—$P_2S_5$, $Li_{10}GeP_2S_{12}$, $Li_7P_3S_1$, $Li_3PS_4$, $Li_{3.25}P_{0.75}S_4$, and the like. These sulfide-based solid electrolyte materials may be used alone or in combination of two or more.

Examples of the oxide-based solid electrolyte material include $Li_2O$—$B_2O_3$—$P_2O_3$, $Li_2O$—$SiO_2$, $Li_2O$—$P_2O_5$, $Li_5La_3Ta_2O_{12}$, $Li_7La_3Zr_2O_{12}$, $Li_6BaLa_2Ta_2O_{12}$, $Li_{3.6}SI_{0.6}P_{0.4}O_4$, $Li_3BO_3$—$Li_2SO_4$—$Li_2CO_3$, and the like.

These oxide-based solid electrolyte materials may be used alone or in combination of two or more.

In addition to the above-mentioned solid electrolyte materials, the solid electrolyte layer may include other components used in all-solid-state secondary batteries. Examples of the other components include metal oxides such as P, As, Ti, Fe, Zn, and Bi, and binders such as polyvinylidene fluoride, polytetrafluoroethylene, polyvinyl alcohol, polyvinyl acetate, polymethyl methacrylate, and polyethylene.

The solid electrolyte may be in a glass state or a glass ceramic state. The glass state means a substantially noncrystalline state. Here, the substantially noncrystalline state includes, the 100% noncrystalline state as well as a state where a crystalline solid electrolyte is finely dispersed in a noncrystalline solid electrolyte. The glass ceramic state means a state generated as a result of heating a solid electrolyte in the glass state to a temperature equal to or higher than the glass transition point.

The solid electrolyte in the glass ceramic state may be in a state in which a crystalline phase is dispersed in a glass amorphous phase. The percentage of the crystalline phase can be determined by transmission electron microscopy, crystal structure analysis by the Rietveld method, or the like.

Furthermore, the solid electrolyte in the glass ceramic state may have no glass transition point that was present in the corresponding solid electrolyte in the glass state.

The solid electrolyte can be formed into a solid electrolyte layer, for example, by being pressed so as to have a predetermined thickness. The pressure of the press may be selected from the pressures in a range of 50 to 2000 MPa.

The method for producing the solid electrolyte layer is not particularly limited as long as the materials of the solid electrolyte can be mixed. As the materials of the solid electrolyte, the above-described materials of the solid electrolyte can be used. As the mixing method, mechanochemical treatment is preferable from the viewpoint of mixing the components more homogeneously.

The basic elements of the mechanochemical treatment are the same as those described above. The treatment conditions can be appropriately set in accordance with the treatment apparatus to be used. For example, when a ball mill is used, the higher the rotational speed and/or the longer the treatment time, the more homogeneously the raw materials can be mixed. Specifically, when a planetary ball mill is used, the conditions are, for example, a rotation speed of 50 to 600 rotations per minute, a treatment time of 0.1 to 100 hours, and 1 to 100 kWh per kg of raw materials.

(Method for Producing Secondary Battery)

The present invention also provides a method for producing a secondary battery using the electrode or electrode composite of the present invention.

(I) Lithium-Ion Secondary Battery

To produce a lithium-ion secondary battery, for example, a lithium-ion secondary battery can be obtained by inserting into a battery can a laminate of the positive electrode of the present invention and a known negative electrode for a lithium-ion secondary battery, and pouring a mixture of an electrolyte and a nonaqueous solvent into the battery can.

A separator may be used between the positive electrode and the negative electrode. In this case, it is preferable to use a microporous polymer film. Specifically, a separator made of a polyolefin polymer, such as nylon, cellulose acetate, nitrocellulose, polysulfone, polyacrylonitrile, polyvinylidene fluoride, polypropylene, polyethylene, or polybutene, can be used.

The positive electrode, separator, and negative electrode may be stacked or rolled up. The electrode composite of the present invention may be used in place of the positive electrode and the negative electrode.

(II) All-Solid-State Battery

An all-solid-state battery can be obtained, for example, by stacking and pressing the positive electrode and solid electrolyte layer of the present invention and a known negative electrode and current collector to obtain a cell and fixing the cell to a container.

A metal layer selected from Au, Pt, In, Al, Sn, Si, or the like may be provided between the negative electrode and the solid electrolyte layer. Further, the metal layer may be provided between the positive electrode and the solid electrolyte layer.

The thickness of the metal layer is preferably 10 nm to 100 μm.

EXAMPLES

Hereinafter, the present invention will be described in more detail by way of Examples and Comparative Examples, but the present invention is not limited thereto. In the following Examples and Comparative Examples, $Li_2S$ manufactured by Mitsuwa Chemicals Co., Ltd. (purity>99.9%), Cu manufactured by Fujifilm Wako Pure Chemical Corporation, S manufactured by Aldrich (99.998%), ZnS manufactured by Fujifilm Wako Pure Chemical Corporation (95+%), and LiCl manufactured by Aldrich (99.998%) were used.

Also, in the following Examples and Comparative Examples, a fully automatic multi-purpose X-ray diffractometer SmartLab manufactured by Rigaku Corporation was used as an X-ray diffractometer. For the constant current charge/discharge measurement, a charge/discharge measurement device (BTS-2004) manufactured by NAGANO &, Co., Ltd. was used. For the DC polarization measurement, a potentiostat (SI-1287) manufactured by TOYO Corporation was used. As the scanning electron microscope (SEM), JSM-5300 manufactured by JEOL Ltd. was used, and for the energy dispersive X-ray analysis (EDS), JED-2300 manufactured by JEOL Ltd. was used.

Example 1

(Preparation of Solid Solution)

The solid solution of one embodiment of the present invention was prepared by the following procedure.

$Li_2S$, Cu, and $S_8$ were mixed at a molar ratio of 3:2:1 in an agate mortar. This mixture was put into a zirconia pot (45 mL) together with zirconia balls (4 mmφ, 500 balls), and subjected to mechanochemical treatment using a planetary ball mill device PULVERISSETTE 7 (P-7) manufactured by Fritsch GmbH to prepare a solid solution. The mechanochemical treatment was performed under the conditions that the number of revolutions of the platen was 370 rpm, and that the treatment time was 90 to 100 hours. No pretreatment of raw materials was performed other than mixing in the agate mortar. The mixture was put into the pot in a glove box under an argon atmosphere. Since lithium salts are chemically unstable, they react with water, oxygen, and/or the like in the glove box. Therefore, the environmental of the glove box was strictly controlled, and the work was performed under an environment where the water concentration was 0.2 ppm or less and the oxygen concentration was 5 ppm or less. A $Li_3CuS_2$ solid solution was thereby prepared.

Example 2

(Preparation of a mixed body Containing Solid Electrolyte)

Li$_3$PS$_4$ glass solid electrolyte powder (LPS) was further mixed into the Li$_3$CuS$_2$ solid solution of Example 1, above. This LPS was prepared as follows.

(Preparation of Li$_3$PS$_4$ Glass Solid Electrolyte Powder)

Commercially available Li$_3$PS$_4$ alone was put into a zirconia pot (45 mL) together with zirconia balls (4 mmφ, 500 balls), and subjected to mechanochemical treatment using the above-mentioned planetary ball mill device P-7 to prepare LPS. The mechanochemical treatment was performed under the conditions that the number of revolutions of the platen was 510 rpm, and that the treatment time was 40 hours.

LPS prepared by the above method was mixed into the Li$_3$CuS$_2$ solid solution using an agate mortar. The mixture was subjected to mechanochemical treatment using the above-mentioned planetary ball mill device P-7 to prepare a mixed body of Li$_3$CuS$_2$-LPS. The mechanochemical treatment was performed under the conditions that the number of revolutions of the platen was 160 rpm and that the treatment time was 1 hour. The mixing ratio of Li$_3$CuS$_2$ and LPS was Li$_3$CuS$_2$:LPS wt %=65:35 wt % ((Li$_3$CuS$_2$-LPS[65:35] mixed body).

Example 3

A Li$_3$CuS$_2$-LPS[50:50] mixed body of Example 3 was prepared in the same manner as in Example 2 above, except that the mechanochemical treatment was not performed when LPS was mixed with the Li$_3$CuS$_2$ solid solution, and that the mixing ratio was Li$_3$CuS$_2$:LPS wt %=50:50 wt %.

(X-Ray Diffraction Measurement of Solid Solution and Mixed Bodies of Examples 1 to 3)

X-ray diffraction (XRD) measurement was performed in order to analyze the structures of the prepared solid solution and mixed bodies. SmartLab was used as the X-ray diffractometer, and structural analysis was performed with CuKα rays (=1.54056×10$^{-10}$ m) at a tube voltage of 45 kV, a tube current of 200 mA, a scanning angle of 2θ=10° to 80°, a sampling interval of 0.02°, and a scanning speed of 10° min-1. Since the prepared solid solution and mixed bodies are unstable in the atmosphere, the packing of the sample on the slide glass and the sealing of the sample on the airtight sample holder were all performed in a glove box under an argon atmosphere. For comparison, XRD measurement was performed on Li$_2$S, Cu, and S$_8$ samples in the same manner.

Figure 2:
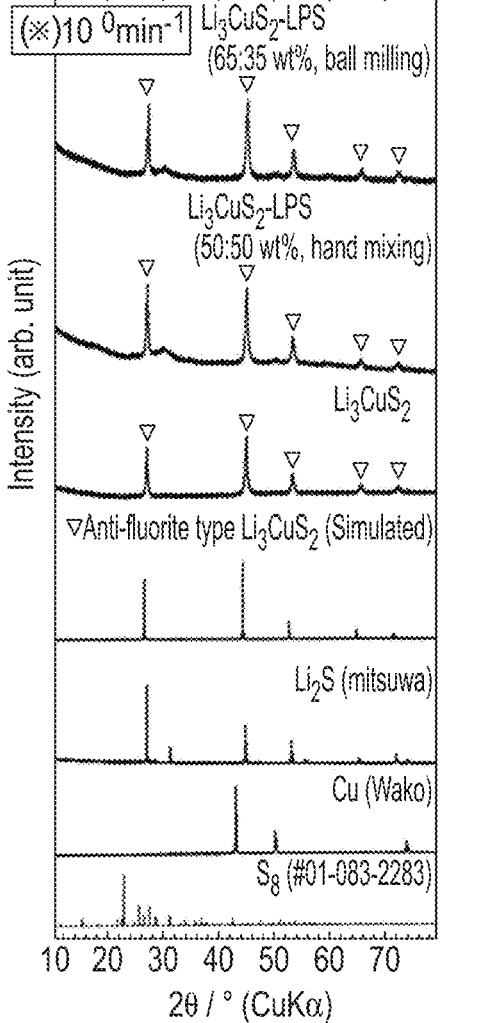
FIG. 2 shows XRD patterns of a $Li_3CuS_2$ solid solution and a $Li_3CuS_2$-LPS mixed body.

FIG. 2 shows XRD patterns of the solid solution and mixed bodies. In addition to the measured data of the above samples, FIG. 2 shows a predicted pattern of Li$_3$CuS$_2$ having an antifluorite structure. As shown in FIG. 2, the XRD pattern of the prepared Li$_3$CuS$_2$ solid solution of Example 1 matches the predicted pattern of the Li$_3$CuS$_2$ solid solution. Therefore, the prepared Li$_3$CuS$_2$ solid solution was shown to have an antifluorite structure. Further, even when the XRD patterns of the Li$_3$CuS$_2$-LPS mixed bodies of Examples 2 and 3 were compared with the XRD pattern of the Li$_3$CuS$_2$ solid solution of Example 1, no clear difference was observed in the XRD patterns. This indicates that no side reaction between Li$_3$CuS$_2$ and LPS occurred in the mixing of the Li$_3$CuS$_2$ solid solution with LPS or the mechanochemical treatment.

(Calculation of Lattice Constant of Li$_3$CuS$_2$ Solid Solution)

The lattice constant of Li$_3$CuS$_2$ was calculated using the Fox software based on the real space method on the basis of the XRD pattern of the Li$_3$CuS$_2$ solid solution of Example 1, and the space group (Fm$\bar{3}$m)

and lattice constant (a=5.76 Å) of Li$_2$S. As a result, the lattice constant of the Li$_3$CuS$_2$ solid solution was found to be a=5.706 Å, which is smaller than that of Li$_2$S. This indicates that Cu$_2$S was dissolved in Li$_2$S to form a solid solution and the lattice constant was reduced. The formation of the solid solution indicates that when Li and Cu have a given composition ratio, a material whose structure continuously changes in accordance with the composition ratio can be obtained.

Example 4

A solid solution represented by Li$_7$CuS$_4$ was prepared in the same manner as in Example 1 except that the molar ratio of Li$_2$S, Cu, and S$_8$ was 7:2:1.

Example 5

A solid solution represented by Li$_5$CuS$_3$ was prepared in the same manner as in Example 1 except that the molar ratio of Li$_2$S, Cu, and S$_8$ was 5:2:1.

Figure 3:
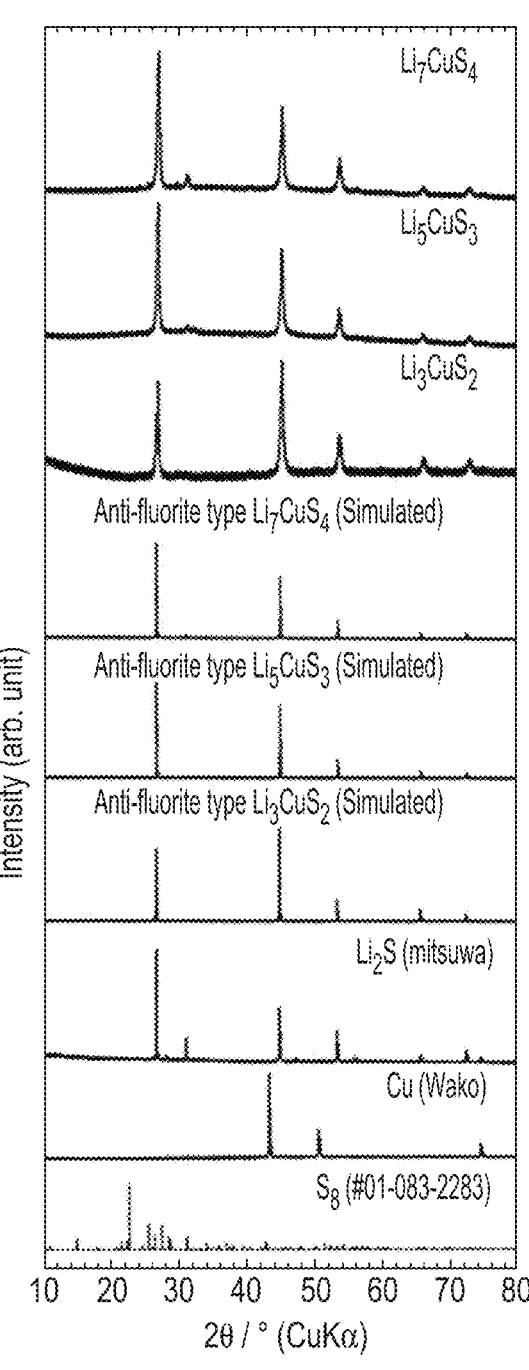
FIG. 3 shows XRD patterns of a $Li_7CuS_4$ solid solution and a $Li_5CuS_3$ solid solution.

FIG. 3 shows the results of X-ray diffraction measurement performed on the solid solutions of Examples 4 and 5 in the same manner as the X-ray diffraction measurement described above. In addition to the measured data of the solid solutions described above, FIG. 3 shows predicted patterns of Li$_7$CuS$_4$ and Li$_5$CuS$_3$ having an antifluorite structure.

As shown in FIG. 3, the XRD patterns of the prepared Li$_7$CuS$_4$ solid solution of Example 4 and the prepared Li$_5$CuS$_3$ solid solution of Example 5 match the predicted patterns. Further, even when the XRD patterns of the prepared Li$_7$CuS$_4$ solid solution of Example 4 and the prepared Li$_5$CuS$_3$ solid solution of Example 5 were compared with the XRD pattern of the Li$_3$CuS$_2$ solid solution of Example 1, no clear difference was observed in the XRD patterns. Therefore, the prepared Li$_7$CuS$_4$ and Li$_5$CuS$_3$ solid solutions were also shown to have an antifluorite structure. The lattice constant a of the Li$_7$CuS$_4$ solid solution was 5.711 Å. The lattice constant a of the solid solution of Li$_5$CuS$_3$ was 5.725 Å. As described above, it was found that Li and Cu can form a solid solution at any composition ratio.

(Preparation of Pellet of Li$_3$CuS$_2$ Solid Solution)

A pellet for conductivity measurement was prepared by using the Li$_3$CuS$_2$ solid solution obtained in Example 1 as an electrode active material. The pellet for electronic conductivity measurement was obtained by uniaxial press forming of 20 mg of the solid solution at room temperature (25° C.) and 360 MPa. The pellet for ionic conductivity measurement was prepared by sandwiching both sides of 43 mg of the solid solution with 40 mg of Li$_3$PS$_4$ glass powder (80 mg in total), performing uniaxial press forming at room temperature (about 25° C.) and 360 MPa, and then attaching a lithium-indium alloy to both sides.

(Measurement of Conductivity of Pellet of Li$_3$CuS$_2$ Solid Solution)

Electronic conductivity and ionic conductivity were measured using the prepared pellet. The measurement was performed using an electrochemical measurement cell in which the pellet was sandwiched between SUS current collectors and a potentiostat SI-1287.

The measurement results are shown in Table 1, below.

TABLE 1

| | $\sigma_e^-$/S cm$^{-1}$ | $\sigma_{Li}{}^+$/S cm$^{-1}$ |
|---|---|---|
| $Li_3CuS_2$ | $9.5 \times 10^{-3}$ | $3.3 \times 10^{-6}$ |

It was found that while $Li_2S$ has a very low electronic conductivity of $10^{-9}$S cm$^{-1}$ or less, whereas the solid solution of the present invention exhibits a high electronic conductivity that is 1000000 times or more higher than that of $Li_2S$ as shown in Table 1.

(Preparation of all-Solid-State Secondary Battery Using Pellet of $Li_3CuS_2$)

An all-solid-state secondary battery was prepared using the prepared pellet as an electrode. The preparation method is as follows.

A double layer pellet of a positive electrode layer and a solid electrolyte layer (SE layer) having a diameter of 10 mm and a thickness of about 0.7 mm was obtained by using about 5 mg of the $Li_3CuS_2$ pellet obtained by the above pellet preparation process as a positive electrode and pressing, at a pressure of 360 MPa, 80 mg of the $Li_3PS_4$ glass solid electrolyte powder prepared by the above method for preparing $Li_3PS_4$ glass solid electrolyte powder. An $Li_3CuS_2$ all-solid-state secondary battery was obtained by stacking, as the negative electrode, a Li—In alloy on the double layer pellet, sandwiching them with stainless steel current collectors, and pressing them again at a pressure of 120 MPa.

(Measurement of Charge/Discharge Capacity)

Using the obtained $Li_3CuS_2$ all-solid-state secondary battery, the charge/discharge capacity was measured. The measurement was performed under the conditions of 25° C. and a current density of 0.13 mA/cm$^2$. Charging and discharging were performed for two cycles in this experiment with one cycle being discharging and charging performed once each.

Figure 4:
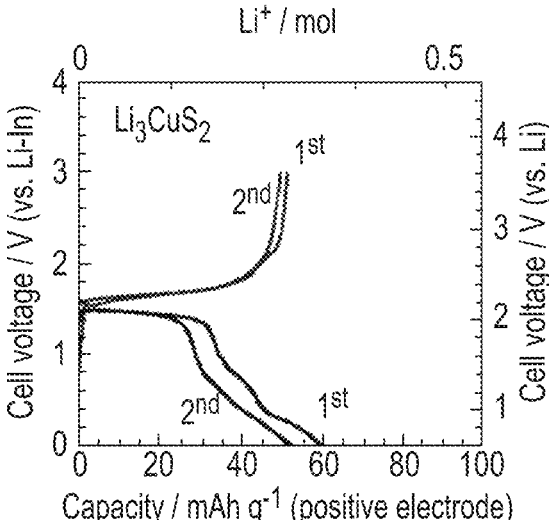
FIG. 4 shows charge/discharge curves of an all-solid-state battery using a $Li_3CuS_2$ solid solution as an electrode active material.

The obtained measurement results are shown in FIG. 4. As shown in FIG. 4, it can be seen that the solid solution of the present invention can be charged and discharged without including a solid electrolyte.

A $Li_3CuS_2$-LPS(65:35) all-solid-state secondary battery was prepared using the $Li_3CuS_2$-LPS[65:35] mixed body of Example 2 as an electrode active material instead of the solid solution of Example 1, and the charge/discharge capacity was measured. The measurement conditions were also the same. Charging and discharging were performed for three cycles.

Figure 5:
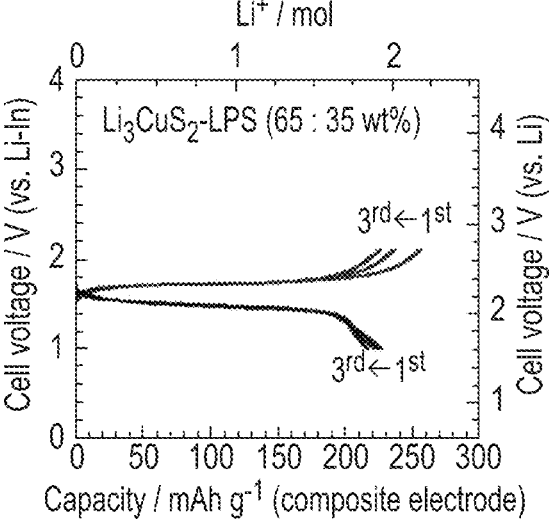
FIG. 5 shows charge/discharge curves of an all-solid-state battery using a $Li_3CuS_2$-LPS[65:35] mixed body as an electrode active material.
Figure 6:
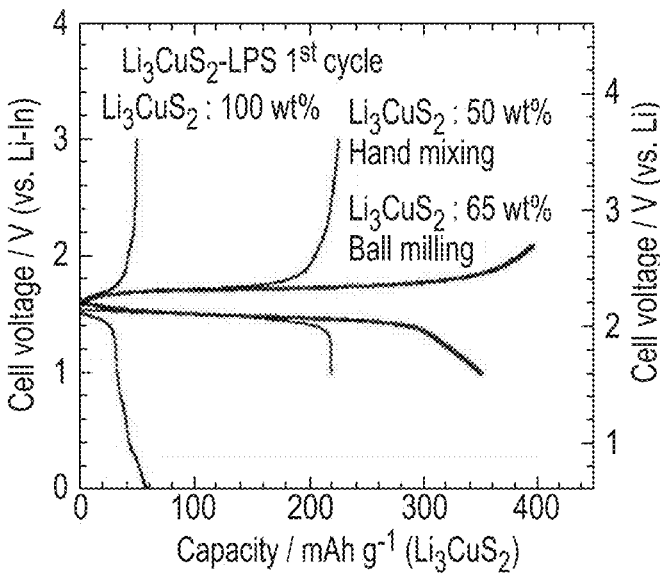
FIG. 6 shows results of converting the results of charging and discharging of the all-solid-state battery using the $Li_3CuS_2$-LPS[65:35] mixed body as an electrode active material as shown in FIG. 5 into charge/discharge capacities per weight of the $Li_3CuS_2$ solid solution in the $Li_3CuS_2$-LPS[65:35] mixed body.

The obtained measurement results are shown in FIG. 5. Further, a $Li_3CuS_2$-LPS(50:50) all-solid state secondary battery was prepared using the $Li_3CuS_2$-LPS[50:50] mixed body of Example 3 as an electrode active material, and the same experiment was conducted, and the obtained charge/discharge capacities were converted into the charge/discharge capacities per weight of the $Li_3CuS_2$ solid solution in the $Li_3CuS_2$-LPS[50:50] mixed body, which are shown in FIG. 6. In FIG. 6, $Li_3CuS_2$:50 wt % shows the result of the $Li_3CuS_2$-LPS(50:50) all-solid-state secondary battery of Example 3, and $Li_3CuS_2$:65 wt % shows the result of the $Li_3CuS_2$-LPS(65:35) all-solid-state secondary battery. As shown in FIG. 5, the charge/discharge capacity was improved by including a solid electrolyte in the solid solution. As shown in FIG. 6, it was found that when the charge/discharge capacity of a mixed body is converted into the charge/discharge capacity per weight of the $Li_3CuS_2$ solid solution included in the mixed body, a high charge/discharge capacity of 300 mAh g$^{-1}$ or more can be obtained.

From the above, it was found that the solid solution of the present invention is excellent as a novel electrode material.

(Cycle Test of Charge/Discharge Capacity)

Example 6

Figure 7A:
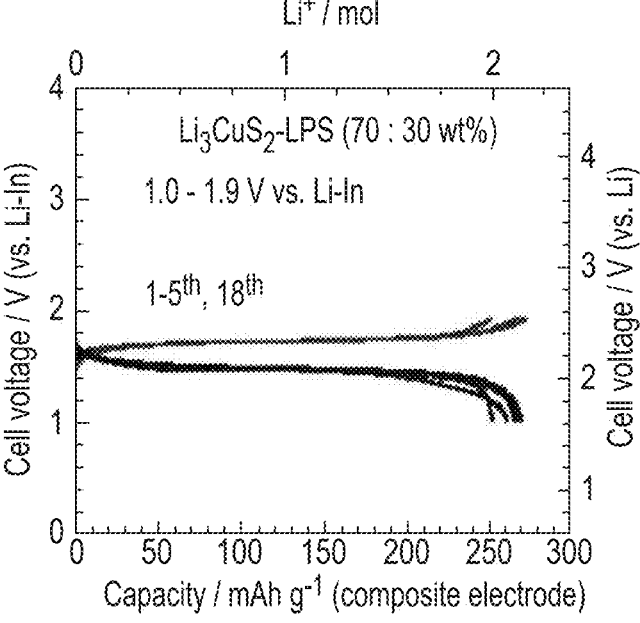
FIG. 7A shows charge/discharge curves obtained by performing a cycle test on an all-solid-state battery using a $Li_3CuS_2$-LPS[70:30] mixed body as an electrode active material.
Figure 7B:
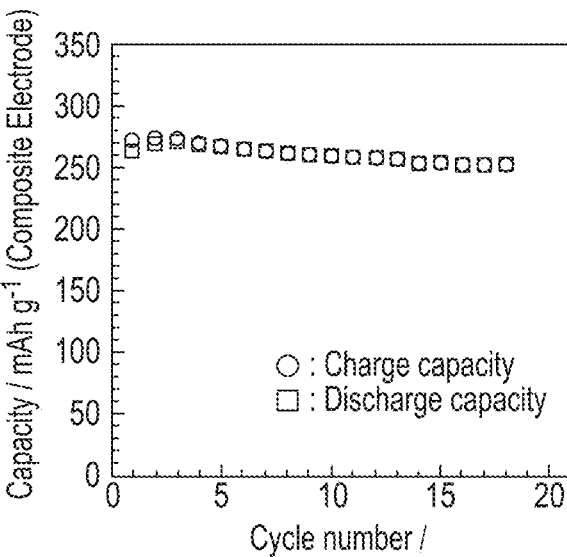
FIG. 7B shows cycle characteristics obtained by performing the cycle test on the all-solid-state battery using the $Li_3CuS_2$-LPS[70:30] mixed body as an electrode active material.

A $Li_3CuS_2$-LPS[70:30] mixed body of Example 6 was prepared in the same manner as in Example 2 except that the mixing ratio of the $Li_3CuS_2$ solid solution and LPS was $Li_3CuS_2$:LPS wt %=70:30 wt %, and a $Li_3CuS_2$-LPS(70:30) all-solid-state secondary battery was prepared using this mixed body by the same method as the above method for preparing the $Li_3CuS_2$ all-solid-state secondary battery. Using this $Li_3CuS_2$-LPS(70:30) all-solid-state secondary battery, the charge/discharge capacity was measured by repeating charging and discharging for 18 cycles. The cutoff voltage at the time of measurement was 1.9 V. The measurement results are shown in FIG. 7A, and the cycle characteristics are shown in FIG. 7B. As shown in FIG. 7A, it can be seen that the prepared $Li_3CuS_2$-LPS(70:30) all-solid-state secondary battery exhibits a high charge/discharge capacity of 250 mAh g$^{-1}$ or more. It was also found that the charge/discharge capacity remained stable over cycles as shown in FIG. 7B.

(Mixing Test of Conductive Assistant)

Example 7

Figure 8A:
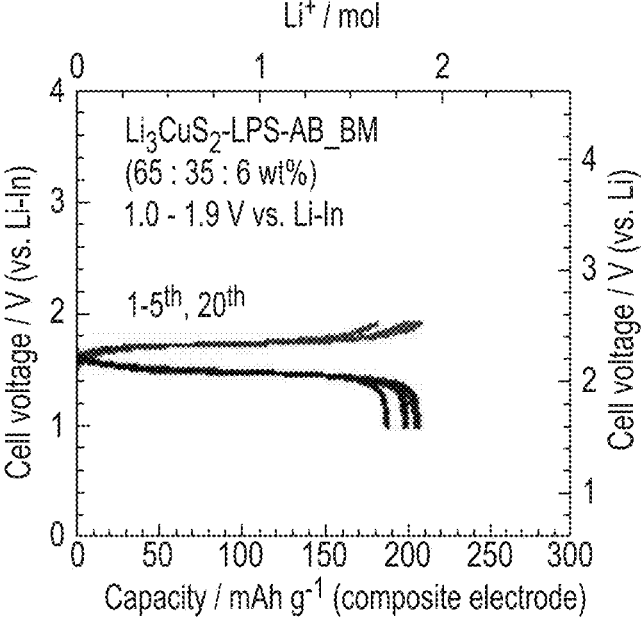
FIG. 8A shows charge/discharge curves obtained by performing a cycle test on an all-solid-state battery using a $Li_3CuS_2$-LPS-AB mixed body as an electrode active material.
Figure 8B:
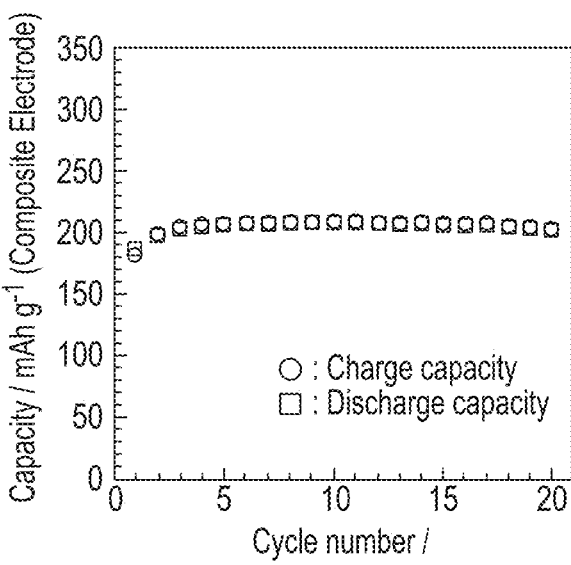
FIG. 8B shows cycle characteristics obtained by performing the cycle test on the all-solid-state battery using the $Li_3CuS_2$-LPS-AB mixed body as an electrode active material.

A $Li_3CuS_2$-LPS-AB mixed body of Example 7 was prepared in the same manner as in Example 2 except that acetylene black (AB) was further mixed as a conductive assistant at a ratio of $Li_3CuS_2$:LPS:AB wt %=65:35:6 wt %. Using this mixed body as an electrode active material, a $Li_3CuS_2$-LPS-AB all-solid-state secondary battery was prepared by the same method as the above method for preparing the $Li_3CuS_2$ all-solid-state secondary battery. Using the $Li_3CuS_2$-LPS-AB all-solid-state secondary battery, the cycle test of the charge/discharge capacity was conducted in the same manner as the above except that the number of cycles was 20. The measurement results are shown in FIG. 8A, and the cycle characteristics are shown in FIG. 8B. As shown in FIG. 8A, an excellent charge/discharge capacity was obtained with the secondary battery to which the conductive assistant was added. Further, as shown in FIG. 8B, the charge/discharge capacity did not change over cycles.

Example 8

(Preparation of $Li_3CuS_2$ Solid Solution with Substitution of ZnS)

A $Li_{2.9}Cu_{0.9}Zn_{0.1}S_2$ solid solution of Example 8 was prepared in the same manner as in Example 1 except that, in addition to $Li_2S$, Cu, and $S_8$, ZnS was mixed at a molar ratio of $Li_2S$:Cu:S:ZnS=29:18:9:2. Using this solid solution as an electrode active material, a pellet was prepared in the same manner as in the above pellet preparation method. The XRD pattern and electronic conductivity were measured for the pellet, and the lattice constant was calculated.

Example 9

(Preparation of $Li_3CuS_2$ Solid Solution with Substitution of LiCl)

A $Li_{2.8}CuS_{1.8}Cl_{0.2}$ solid solution of Example 9 was prepared in the same manner as in Example 1 except that, in addition to $Li_2S$, Cu, and $S_8$, LiCl was mixed at a molar ratio of $Li_2S:Cu:S:LiCl=13:10:5:2$. Using this solid solution as an electrode active material, a pellet was prepared in the same manner as in the above pellet preparation method. The XRD pattern and electronic conductivity were measured for the pellet, and the lattice constant was calculated.

Example 10

A $Li_{2.9}CuS_{1.9}Cl_{0.1}$ solid solution of Example 10 was prepared in the same manner as in Example 9 except that LiCl of Example 9 was mixed at the molar ratio of $Li_2S:Cu:S:LiCl=14:10:5:1$. Using this solid solution as an electrode active material, a pellet was prepared in the same manner as in the above pellet preparation method. The XRD pattern and electronic conductivity were measured for the pellet.

Figure 9:
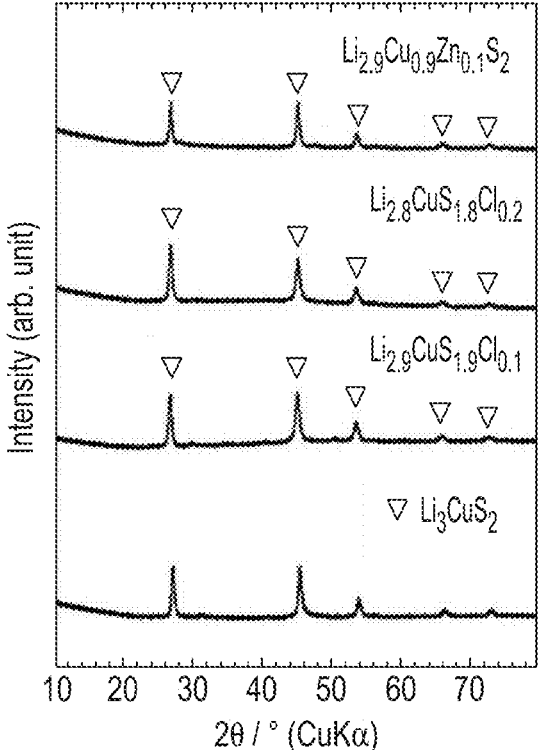
FIG. 9 shows XRD patterns of $Li_{2.9}Cu_{0.9}Zn_{0.1}S_2$, $Li_{2.8}CuS_{1.8}Cl_{0.2}$, and a $Li_{2.9}CuS_{1.9}Cl_{0.1}$ solid solution

The XRD patterns obtained from the solid solutions of Examples 8 to 10 are shown in FIG. 9. From FIG. 9, it was found that a similar pattern to that of the $Li_3CuS_2$ solid solution was observed and the antifluorite structure was maintained in all the solid solutions. The lattice constant a of the $Li_{2.9}Cu_{0.9}Zn_{0.1}S_2$ solid solution of Example 8 was 5.674 Å. The lattice constant a of the $Li_{2.8}CuS_{1.8}Cl_{0.2}$ solid solution of Example 9 was 5.720 Å. As described above, it was found that the lattice constant is decreased by substituting a part of $Li_3CuS_2$ having a lattice constant of 5.706 Å with ZnS, and that the lattice constant is increased by substituting a part of $Li_3CuS_2$ with LiCl. It was found that the lattice constant can be changed by substituting a part of the $Li_2S$—$Cu_2S$-based solid solution of the present invention. From these, it was found that a part of the $Li_2S$—$Cu_2S$-based solid solution can be substituted by various kinds of cations and anions.

The measurement results of the electronic conductivity obtained from the solid solutions of Examples 8 and 9 are shown in Table 2.

TABLE 2

|  | $\sigma_e$/S cm$^{-1}$ |
| --- | --- |
| $Li_{2.9}Cu_{0.9}Zn_{0.1}S_2$ | $9.5 \times 10^{-2}$ |
| $Li_{2.8}CuS_{1.8}Cl_{0.2}$ | $6.0 \times 10^{-2}$ |
| $Li_3CuS_2$ | $9.5 \times 10^{-3}$ |

From Table 2, it was found that the solid solutions of Examples 8 and 9 both exhibit a higher electronic conductivity than the $Li_3CuS_2$ solid solution.

Figure 10:
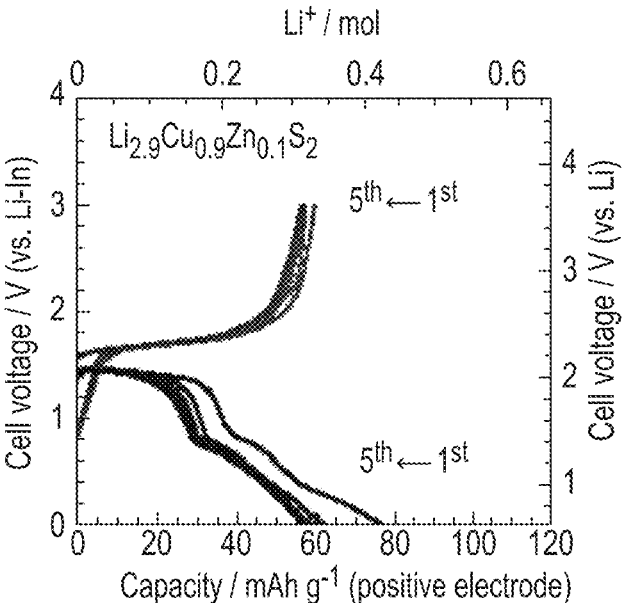
FIG. 10 shows charge/discharge curves obtained by performing a cycle test on an all-solid-state battery using a $Li_{2.9}Cu_{0.9}Zn_{0.1}S_2$ solid solution as an electrode active material.
Figure 11:
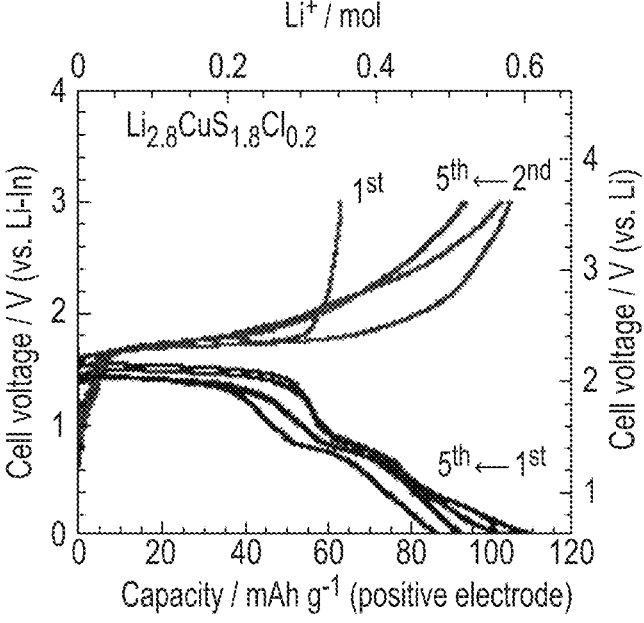
FIG. 11 shows charge/discharge curves obtained by performing a cycle test on an all-solid-state battery using a $Li_{2.8}CuS_{1.8}Cl_{0.2}$ solid solution as an electrode active material.

A $Li_{2.9}Cu_{0.9}Zn_{0.1}S_2$ all-solid-state secondary battery and a $Li_{2.8}CuS_{1.8}Cl_{0.2}$ all-solid-state secondary battery were prepared by performing, on the pellets of Examples 8 and 9, the same method as the above method for preparing the $Li_3CuS_2$ all-solid-state secondary battery. Using these all-solid-state secondary batteries, the charge/discharge capacities were measured. Charging and discharging were performed for five cycles. The results of the measurements on the respective batteries are shown in FIGS. 10 and 11. As shown in FIG. 10, the $Li_{2.9}Cu_{0.9}Zn_{0.1}S_2$ all-solid-state secondary battery can be charged and discharged. As shown in FIG. 11, it was found that the $Li_{2.8}CuS_{1.8}Cl_{0.2}$ all-solid-state secondary battery exhibits a better charge/discharge capacity than the $Li_3CuS_2$ all-solid-state secondary battery.

Example 11

A $Li_{2.9}Cu_{0.9}Zn_{0.1}S_2$-LPS mixed body of Example 11 was prepared in the same manner as in Example 2 except that a $Li_{2.9}Cu_{0.9}Zn_{0.1}S_2$ solid solution was used as the solid solution.

Example 12

A $Li_{2.8}CuS_{1.8}Cl_{0.2}$-LPS mixed body of Example 12 was prepared in the same manner as in Example 2 except that the $Li_{2.8}CuS_{1.8}Cl_{0.2}$ solid solution and LPS were mixed at a molar ratio of $Li_{2.8}CuS_{1.8}Cl_{0.2}:LPS=70:30$.

Example 13

A $Li_{2.9}CuS_{1.9}Cl_{0.1}$-LPS mixed body of Example 12 was prepared in the same manner as in Example 2 except that the $Li_{2.9}CuS_{1.9}Cl_{0.1}$ solid solution and LPS were mixed at a molar ratio of $Li_{2.9}CuS_{1.9}Cl_{0.1}:LPS=70:30$.

Using the mixed bodys of Examples 11 to 13 as electrode active materials, three types of all-solid state secondary batteries ($Li_{2.9}Cu_{0.9}Zn_{0.1}S_2$-LPS all-solid-state secondary battery, $Li_{2.8}CuS_{1.8}Cl_{0.2}$-LPS all-solid-state secondary battery, and $Li_{2.9}CuS_{1.9}Cl_{0.1}$-LPS all-solid-state secondary battery) were prepared by the same method as the above method for preparing the $Li_3CuS_2$ all-solid-state secondary battery. Using these all-solid-state secondary batteries, the charge/discharge capacities were measured. Charging and discharging were performed for five cycles for the $Li_{2.9}Cu_{0.9}Zn_{0.1}S_2$-LPS all-solid-state secondary battery of Example 11, 14 cycles for the $Li_{2.8}CuS_{1.8}Cl_{0.2}$-LPS all-solid-state secondary battery of Example 12, and 13 cycles for the $Li_{2.9}CuS_{1.9}Cl_{0.1}$-LPS all-solid-state secondary battery of Example 13. The cutoff value was 2.0 V for the $Li_{2.9}Cu_{0.9}Zn_{0.1}S_2$-LPS all-solid-state secondary battery of Example 11, and 1.9 V for the $Li_{2.8}CuS_{1.8}Cl_{0.2}$-LPS all-solid-state secondary battery of Example 12 and the $Li_{2.9}CuS_{1.9}Cl_{0.1}$-LPS all-solid-state secondary battery of Example 13.

Figure 12:
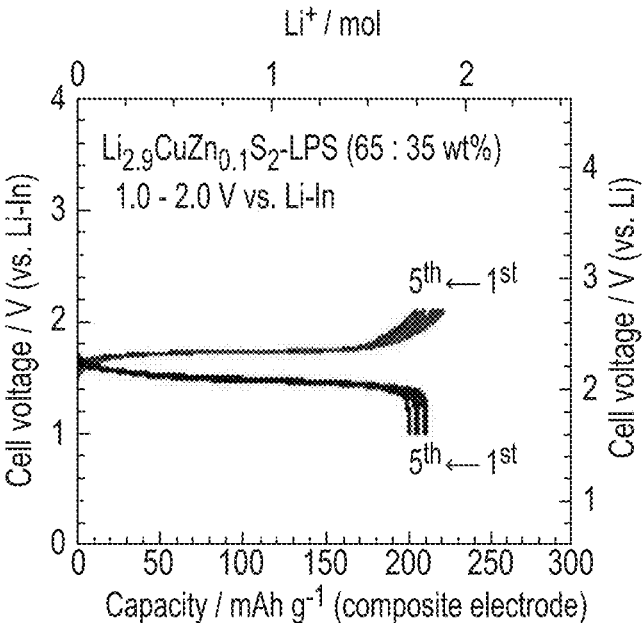
FIG. 12 shows charge/discharge curves of an all-solid-state battery using a $Li_{2.9}Cu_{0.9}Zn_{0.1}S_2$-LPS mixed body as an electrode active material.
Figure 13:
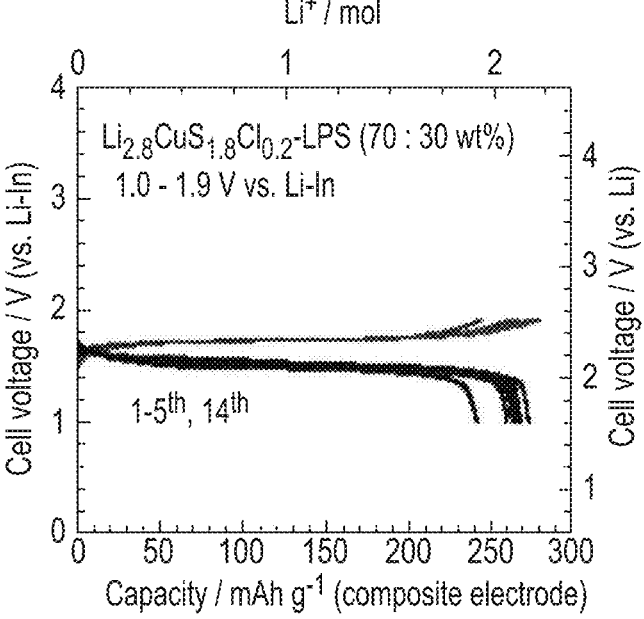
FIG. 13 shows charge/discharge curves of an all-solid-state battery using a $Li_{2.8}CuS_{1.8}Cl_{0.2}$-LPS mixed body as an electrode active material.
Figure 14:
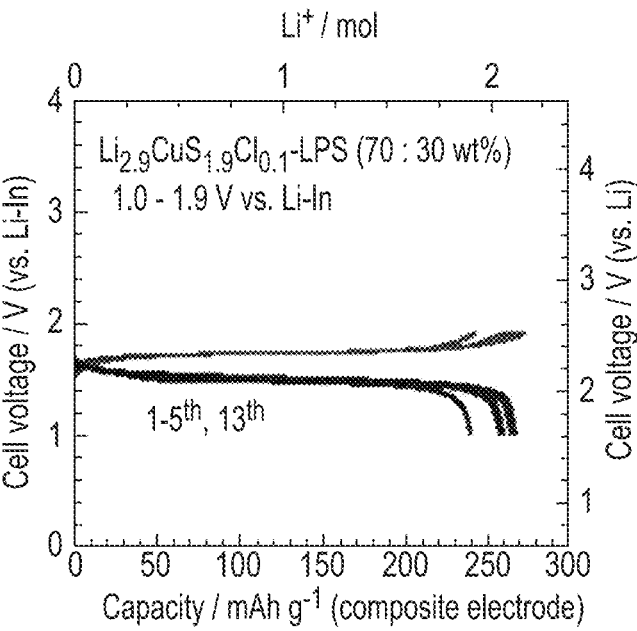
FIG. 14 shows charge/discharge curves of an all-solid-state battery using a $Li_{2.9}CuS_{1.9}Cl_{0.1}$-LPS mixed body as an electrode active material.

These results are shown in FIGS. 12 to 14. From these results, it was found that the all-solid-state secondary batteries using the mixed bodies of Examples 11 to 13 all exhibit an excellent charge/discharge capacity, and that the capacities were stable even after repeated charging and discharging.

(SEM-EDS Measurement of $Li_3CuS_2$ Solid Solution and $Li_3CuS_2$-LPS Mixed body)

The $Li_3CuS_2$ solid solution and the $Li_3CuS_2$-LPS[70:30] mixed body prepared in Examples 1 and 6 were subjected to SEM-EDS.

Figure 15A:
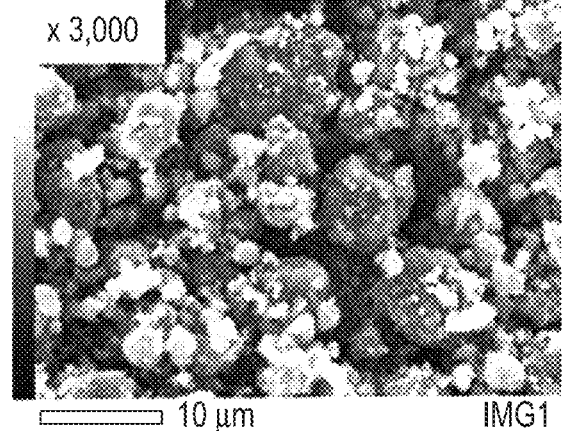
FIG. 15A is a 3000×SEM image of the $Li_3CuS_2$ solid solution.
Figure 15B:
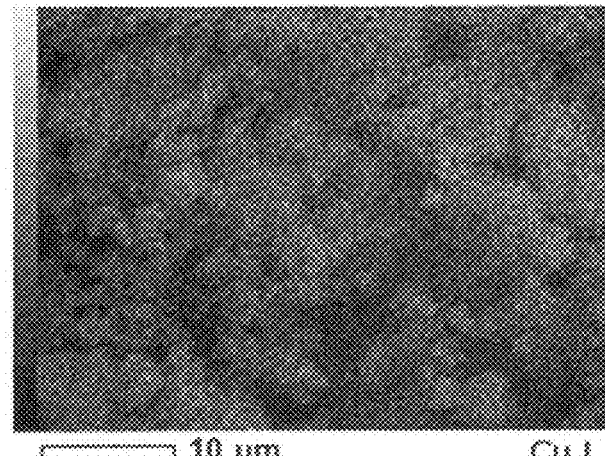
FIG. 15B is a 3000×SEM-EDS mapping image of the $Li_3CuS_2$ solid solution for Cu.
Figure 15C:
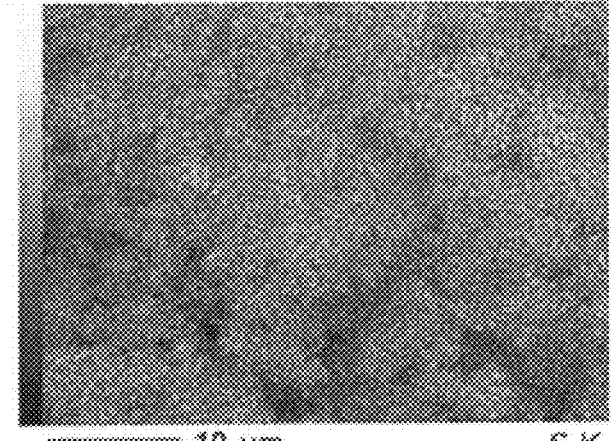
FIG. 15C is a 3000×SEM-EDS mapping image of the $Li_3CuS_2$ solid solution for S.
Figure 16A:
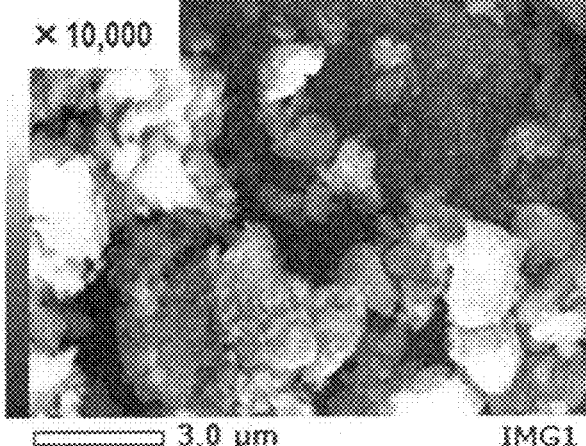
FIG. 16A is a 10000×SEM image of the $Li_3CuS_2$ solid solution.
Figure 16B:
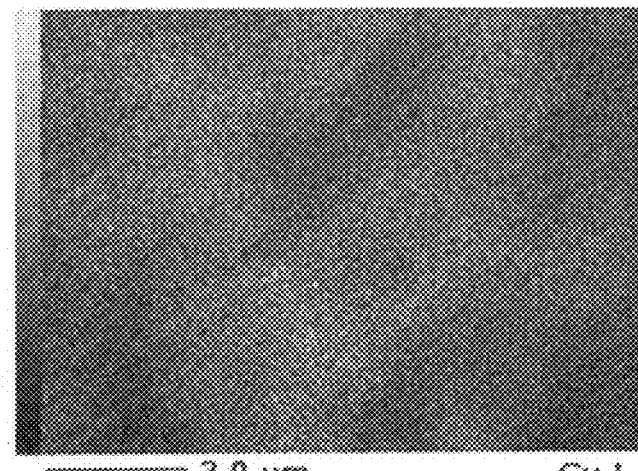
FIG. 16B is a 10000×SEM-EDS mapping image of the $Li_3CuS_2$ solid solution for Cu.
Figure 16C:
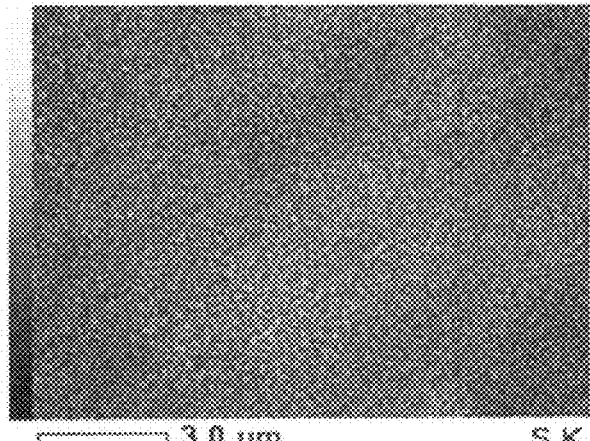
FIG. 16C is a 10000×SEM-EDS mapping image of the $Li_3CuS_2$ solid solution for S.

FIGS. 15A to 15C show the results of measurements on the $Li_3CuS_2$ solid solution at an acceleration voltage of 15 kV and a magnification of 3000 times, and FIGS. 16A to 16C show those at an acceleration voltage of 15 kV and a magnification of 10000 times. FIGS. 15A and 16A are SEM images, and FIGS. 15B and 15C and FIGS. 16B and 16C are results of mapping the images of FIGS. 15A and 16A for elements Cu and S.

As shown in FIGS. 15A to 15C and FIGS. 16A to 16C, it was found that elements Cu and S were homogeneously dispersed without any deviation in the $Li_3CuS_2$ solid solution.

Figure 17A:
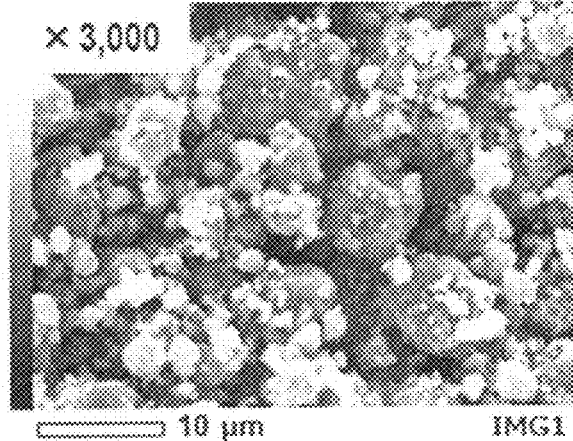
FIG. 17A is a 3000×SEM image of the $Li_3CuS_2$-LPS[70:30] mixed body.
Figure 17B:
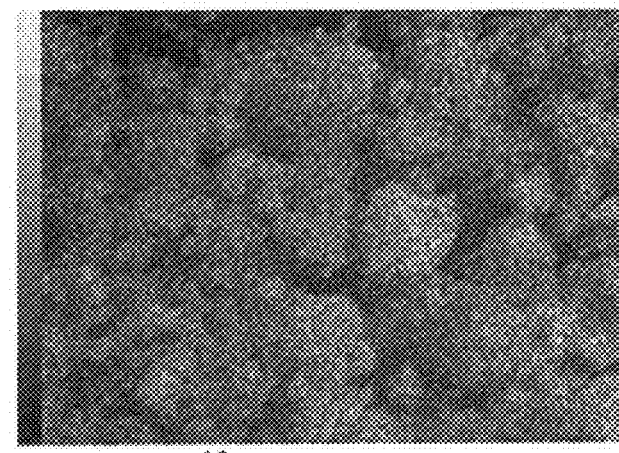
FIG. 17B is a 3000×SEM-EDS mapping image of the $Li_3CuS_2$-LPS[70:30] mixed body for Cu.
Figure 17C:
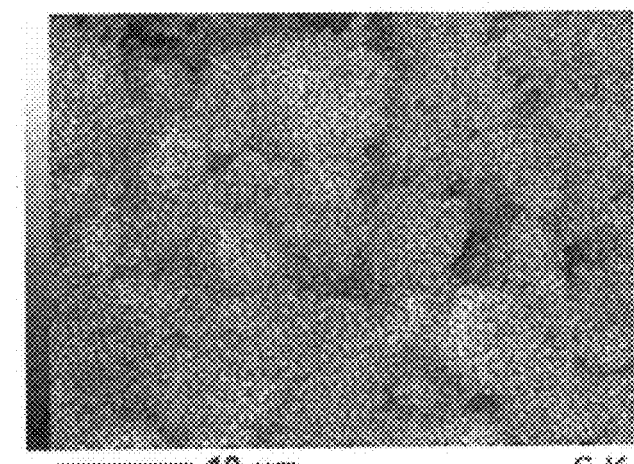
FIG. 17C is a 3000×SEM-EDS mapping image of the $Li_3CuS_2$-LPS[70:30] mixed body for S.
Figure 17D:
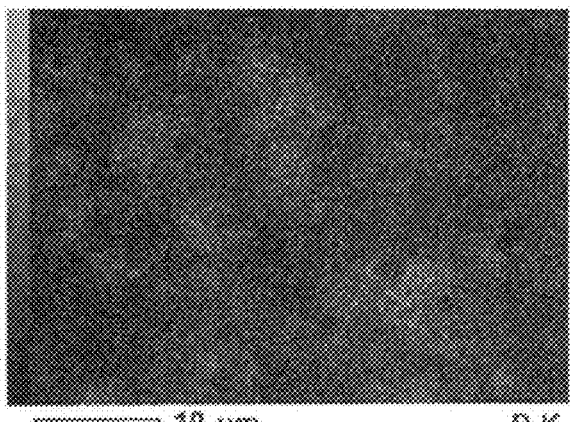
FIG. 17D is a 3000×SEM-EDS mapping image of the $Li_3CuS_2$-LPS[70:30] mixed body for P.
Figure 18A:
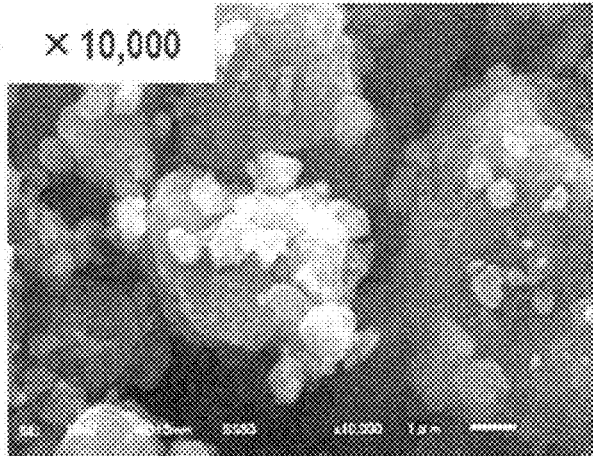
FIG. 18A is a 10000×SEM image of the $Li_3CuS_2$-LPS[70:30] mixed body.
Figure 18B:
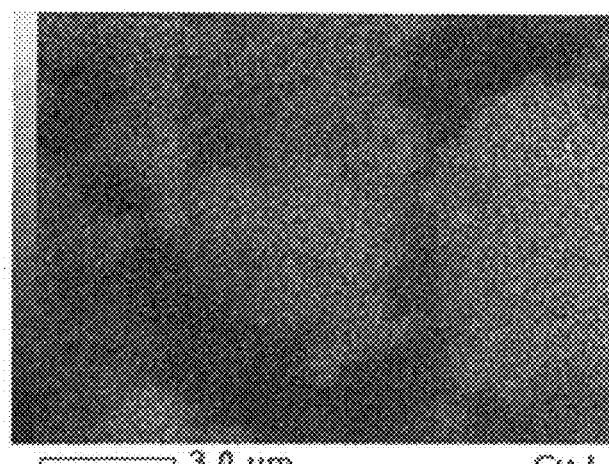
FIG. 18B is a 10000×SEM-EDS mapping image of the $Li_3CuS_2$-LPS[70:30] mixed body for Cu.
Figure 18C:
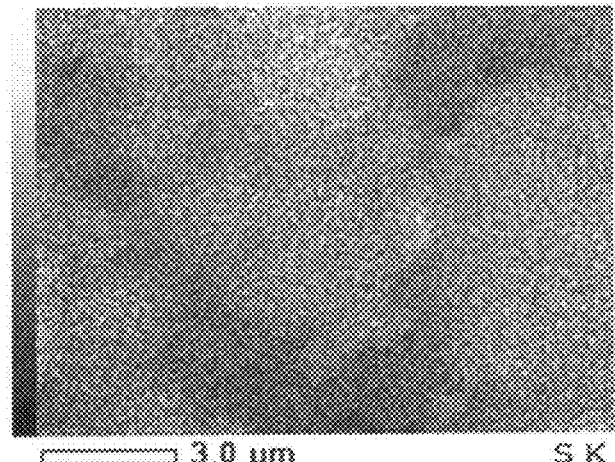
FIG. 18C is a 10000×SEM-EDS mapping image of the $Li_3CuS_2$-LPS[70:30] mixed body for S.
Figure 18D:
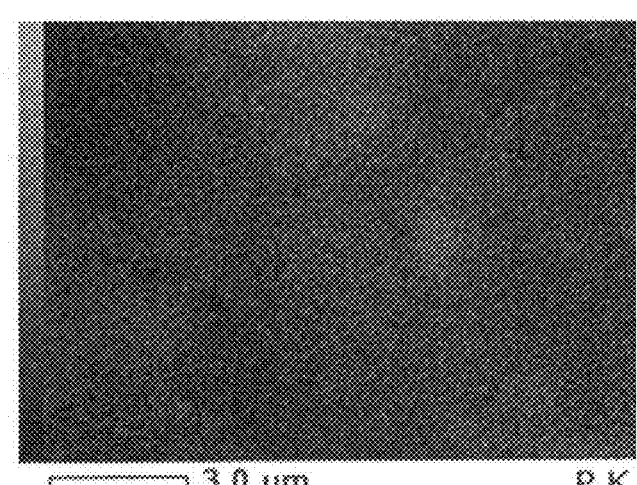
FIG. 18D is a 10000×SEM-EDS mapping image of the $Li_3CuS_2$-LPS[70:30] mixed body for P.
Figure 19A:
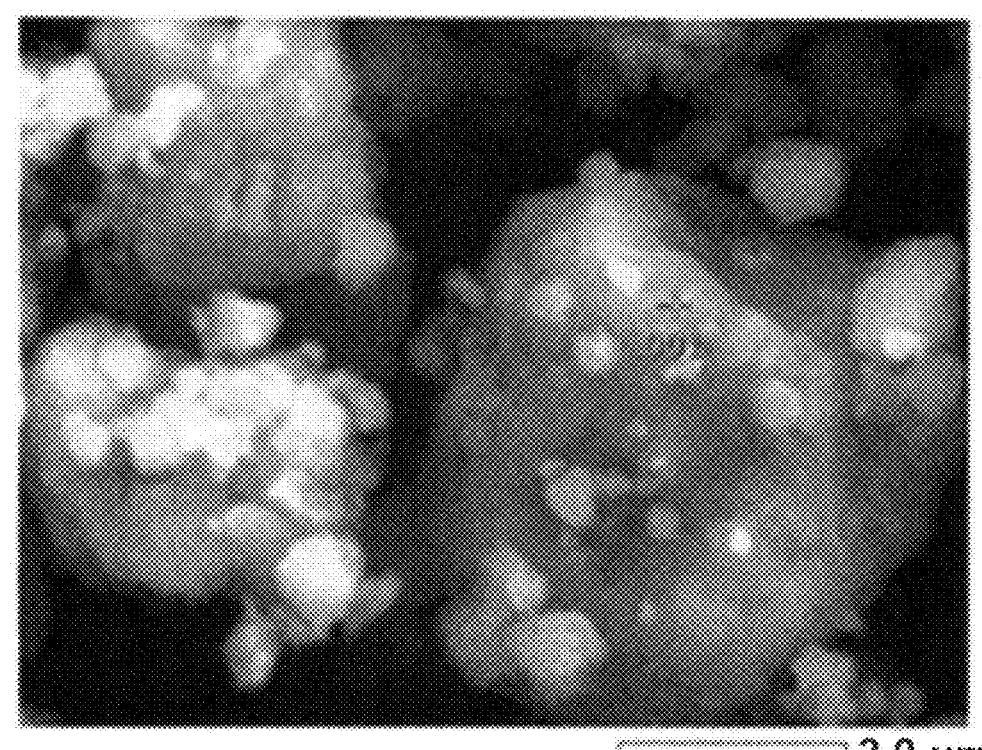
FIG. 19A shows an EDS point analysis of the $Li_3CuS_2$-LPS[70:30] mixed body.
Figure 19A:
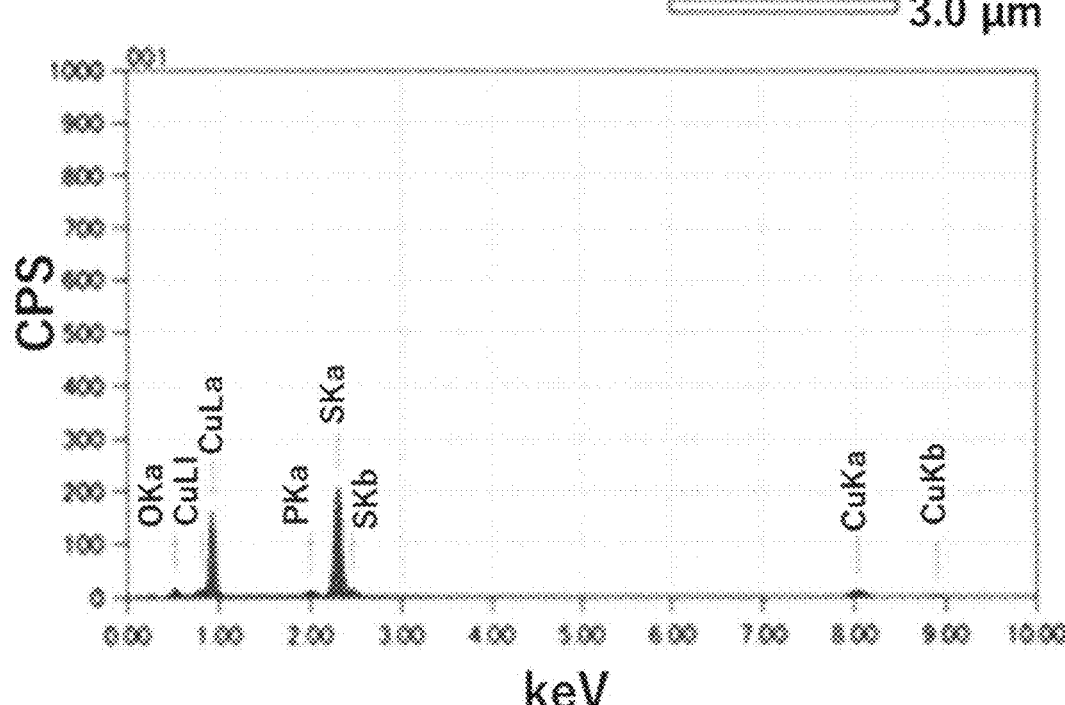
Figure 19B:
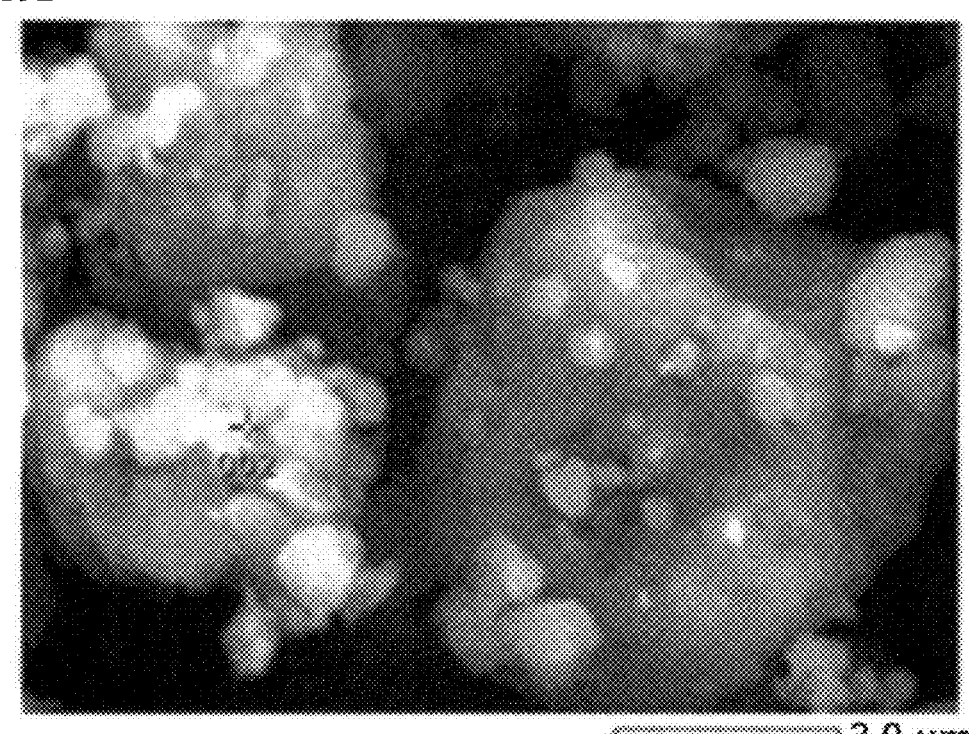
FIG. 19B shows an EDS point analysis of the $Li_3CuS_2$-LPS[70:30] mixed body.
Figure 19B:
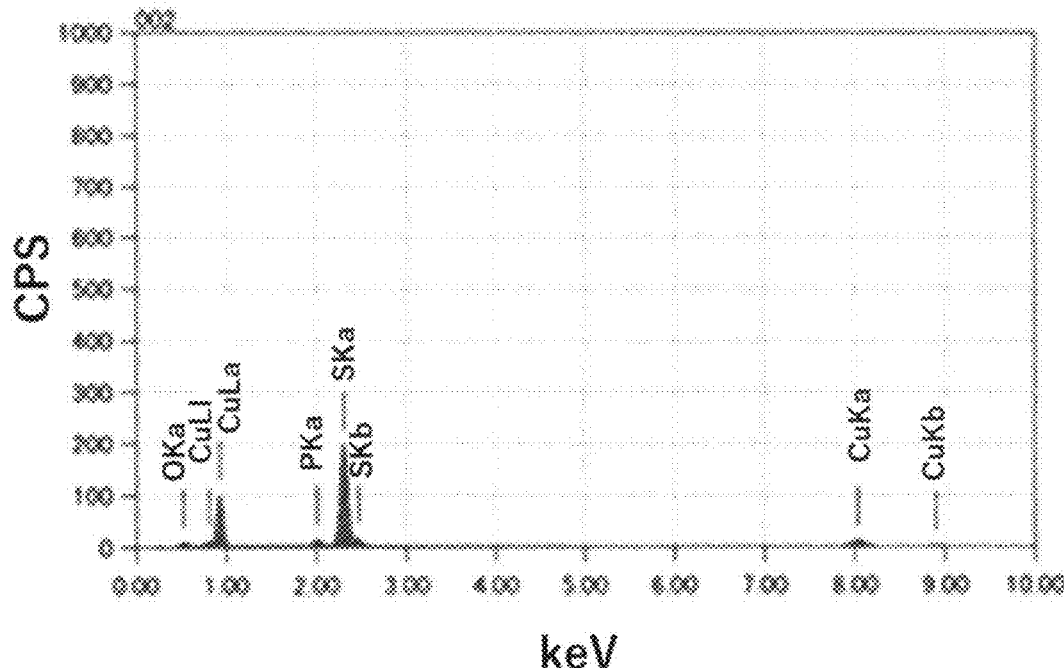
Figure 19C:
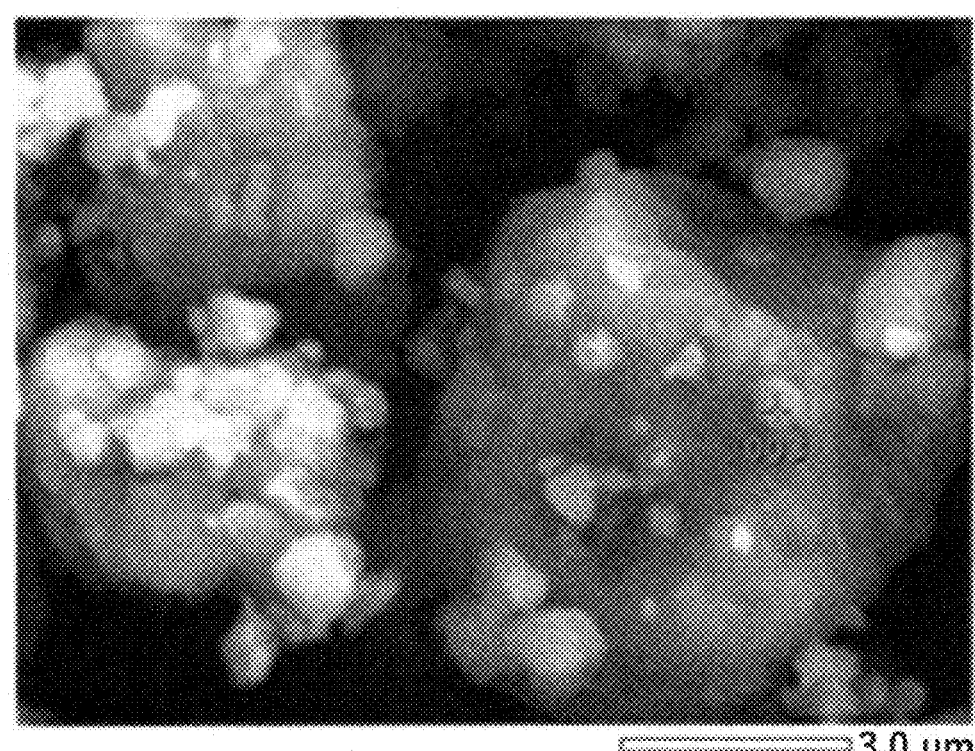
FIG. 19C shows an EDS point analysis of the $Li_3CuS_2$-LPS[70:30] mixed body.
Figure 19C:
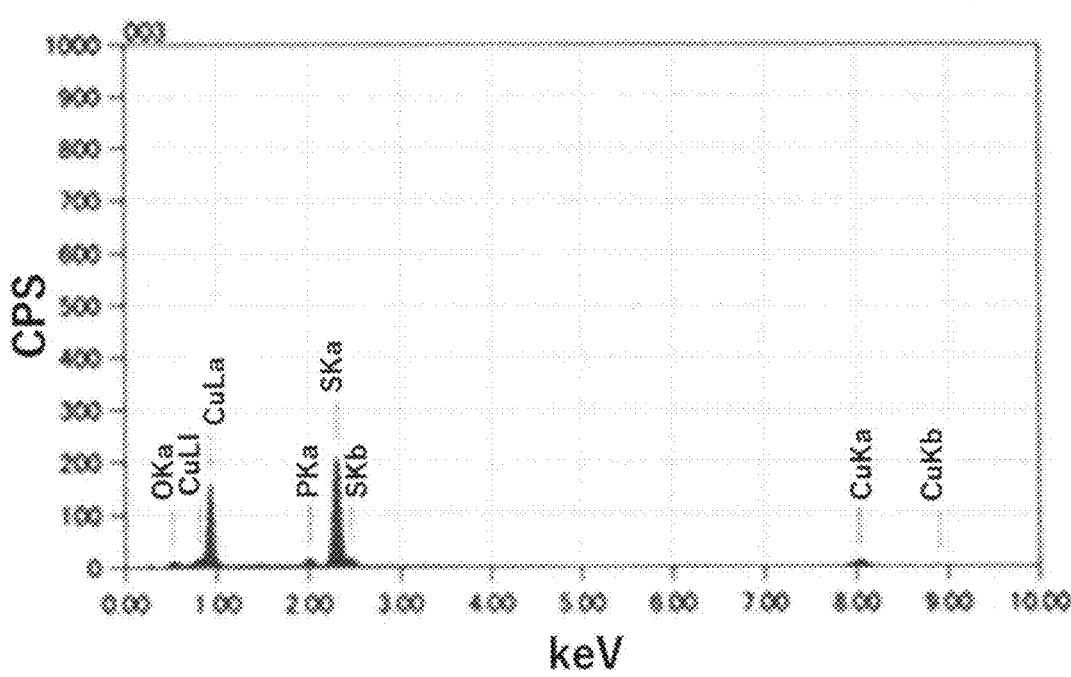
Figure 19D:
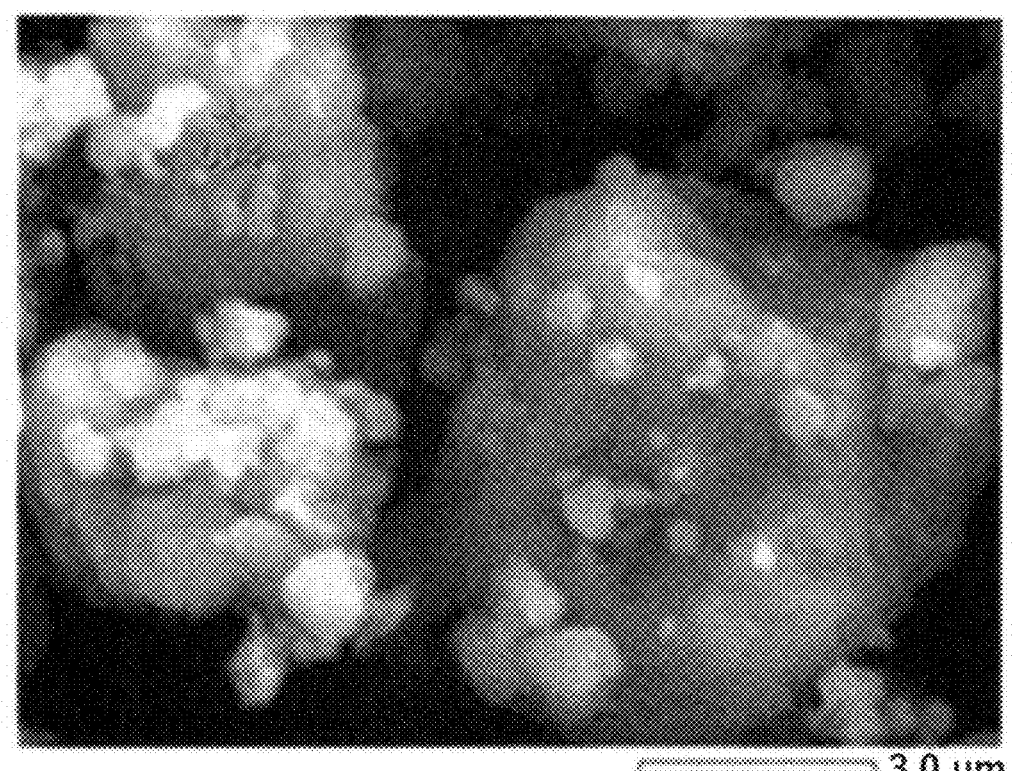
FIG. 19D shows an EDS point analysis of the $Li_3CuS_2$-LPS[70:30] mixed body.
Figure 19D:
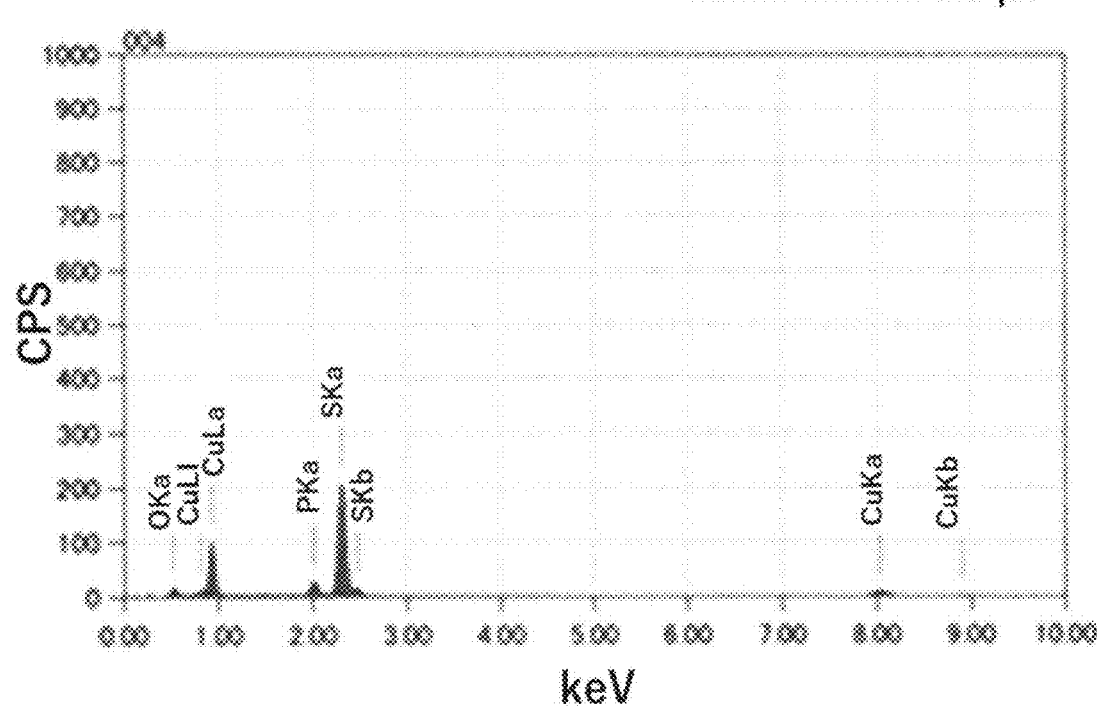

As done for the $Li_3CuS_2$ solid solution, the results of measurements on the $Li_3CuS_2$-LPS[70:30] mixed body at an acceleration voltage of 15 kV and a magnification of 3000 times are shown in FIGS. 17A to 17D, and those at an acceleration voltage of 15 kV and a magnification of 10000 times are shown in FIGS. 18A to 18D. FIGS. 17A and 18A are SEM images, and FIGS. 17B to 17D and FIGS. 18B to 18D are results of mapping the images of FIGS. 17A and 18A for elements Cu, S, and P.

As shown in FIGS. 17A to 17C and FIGS. 18A to 18C, it was found that elements Cu and S were homogeneously dispersed without any deviation in the $Li_3CuS_2$-LPS[70:30] mixed body. On the other hand, P derived from the solid electrolyte was found to be unevenly distributed in the mixed body.

FIGS. 19A to 19D show examples of the results of observations of the elemental composition at respective measurement points during the SEM-EDS measurement of the $Li_3CuS_2$-LPS[70:30] mixed body.

From FIGS. 19A to 19D, it was found that the element distribution shows almost the same shape in the $Li_3CuS_2$-LPS[70:30] mixed body, and this mixed body shows the same crystal structure as a whole.

(Second Cycle Test of Charge/Discharge Capacity)

Example 14

Figure 20A:
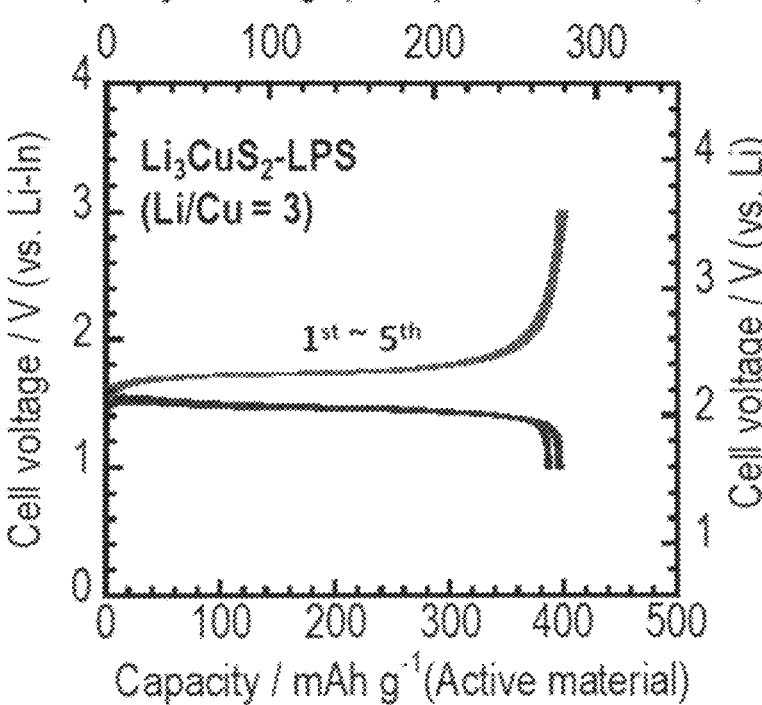
FIG. 20A shows charge/discharge curves obtained when a cycle test was performed on the all-solid-state battery using the $Li_3CuS_2$-LPS[70:30] mixed body as an electrode active material.
Figure 20B:
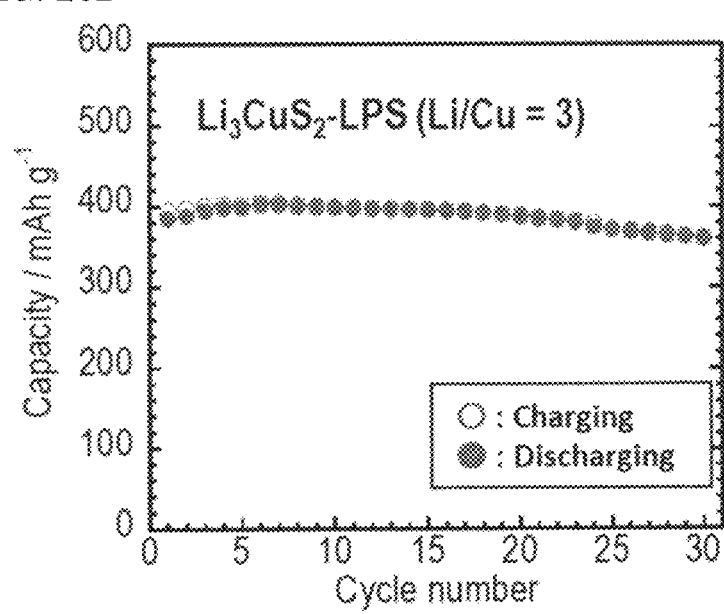
FIG. 20B shows cycle characteristics obtained when a cycle test was performed on the all-solid-state battery using the $Li_3CuS_2$-LPS[70:30] mixed body as an electrode active material.

A $Li_3CuS_2$-LPS[70:30] mixed body of Example 14 was prepared in the same manner as in Example 2 except that the mixing ratio of the $Li_3CuS_2$ solid solution and LPS was $Li_3CuS_2$:LPS wt %=70:30 wt %, and a $Li_3CuS_2$-LPS(70:30) all-solid-state secondary battery was prepared using this mixed body by the same method as the above method for preparing the $Li_3CuS_2$ all-solid-state secondary battery. Using this $Li_3CuS_2$-LPS(70:30) all-solid-state secondary battery, the charge/discharge capacity was measured by repeating charging and discharging for 30 cycles. The cutoff voltage at the time of measurement was 3.0 V. The measurement results are shown in FIG. 20A, and the cycle characteristics are shown in FIG. 20B. As shown in FIG. 20A, it can be seen that the prepared $Li_3CuS_2$-LPS(70:30) all-solid-state secondary battery exhibits a high charge/discharge capacity of 350 mAh $g^{-1}$ or more. It was also found that the charge/discharge capacity remained stable over cycles as shown in FIG. 20B.

Example 15

A solid solution represented by $Li_8Cu_2S_5$ was prepared in the same manner as in Example 1 except that the molar ratio of $Li_2S$, Cu, and $S_8$ was 4:2:1.

Example 16

Figure 21A:
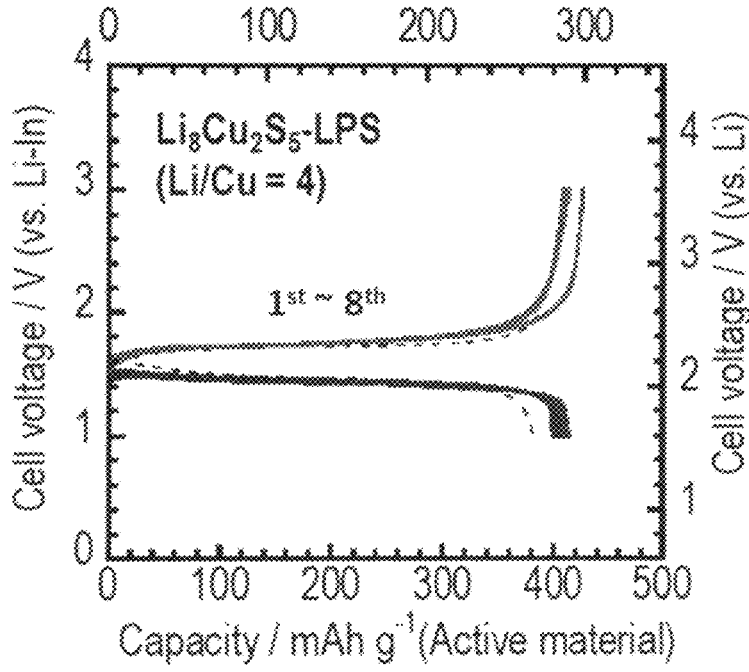
FIG. 21A shows charge/discharge curves obtained when a cycle test was performed on an all-solid-state battery using a $Li_8Cu_2S_5$-LPS[70:30] mixed body as an electrode active material.
Figure 21B:
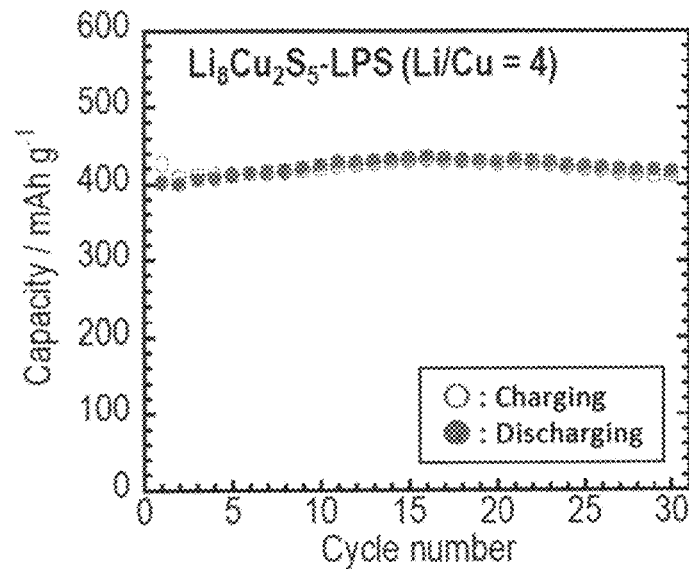
FIG. 21B shows cycle characteristics obtained when a cycle test was performed on the all-solid-state battery using the $Li_8Cu_2S_5$-LPS[70:30] mixed body as an electrode active material.

A $Li_8Cu_2S_5$-LPS[70:30] mixed body of Example 16 was prepared in the same manner as in Example 2 except that the mixing ratio of the $Li_8Cu_2S_5$ solid solution of Example 15 and LPS was $Li_8Cu_2S_5$:LPS wt %=70:30 wt %, and a $Li_8Cu_2S_5$-LPS(70:30) all-solid-state secondary battery was prepared using this mixed body by the same method as the above method for preparing the $Li_3CuS_2$ all-solid-state secondary battery. Using this $Li_8Cu_2S_5$-LPS(70:30) all-solid state secondary battery, the charge/discharge capacity was measured by repeating charging and discharging for 30 cycles. The cutoff voltage at the time of measurement was 3.0 V. The measurement results are shown in FIG. 21A, and the cycle characteristics are shown in FIG. 21B. As shown in FIG. 21A, it can be seen that the prepared $Li_8Cu_2S_5$-LPS (70:30) all-solid-state secondary battery exhibits a high charge/discharge capacity of 350 mAh $g^{-1}$ or more. It was also found that the charge/discharge capacity remained stable over cycles as shown in FIG. 21B.

Example 17

Figure 22A:
FIG. 22A shows charge/discharge curves obtained when a cycle test was performed on an all-solid-state battery using a $Li_5CuS_3$-LPS[70:30] mixed body as an electrode active material.
Figure 22A:
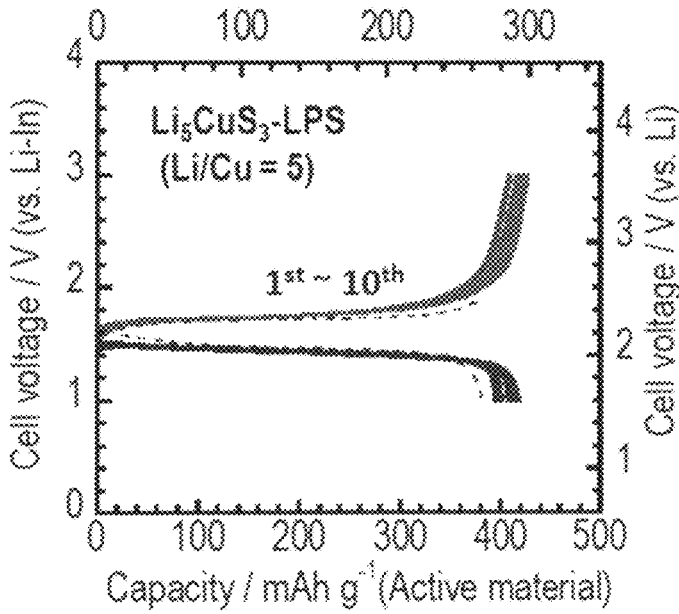
Figure 22B:
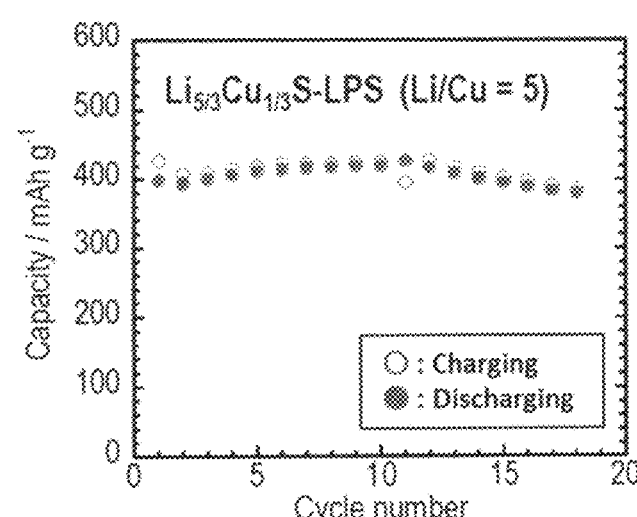
FIG. 22B shows cycle characteristics obtained when a cycle test was performed on the all-solid-state battery using the $Li_5CuS_3$-LPS[70:30] mixed body as an electrode active material.

A $Li_5CuS_3$-LPS[70:30] mixed body of Example 17 was prepared in the same manner as in Example 2 except that the mixing ratio of the $Li_5CuS_3$ solid solution of Example 5 and LPS was $Li_5CuS_3$:LPS wt %=70:30 wt %, and a $Li_5CuS_3$-LPS(70:30) all-solid-state secondary battery was prepared using this mixed body by the same method as the above method for preparing the $Li_3CuS_2$ all-solid-state secondary battery. Using this $Li_5CuS_3$-LPS(70:30) all-solid-state secondary battery, the charge/discharge capacity was measured by repeating charging and discharging for 18 cycles. The cutoff voltage at the time of measurement was 3.0 V. The measurement results are shown in FIG. 22A, and the cycle characteristics are shown in FIG. 22B. As shown in FIG. 22A, it can be seen that the prepared $Li_5CuS_3$-LPS(70:30) all-solid-state secondary battery exhibits a high charge/discharge capacity of 350 mAh $g^{-1}$ or more. It was also found that the charge/discharge capacity remained stable over cycles as shown in FIG. 22B.

Example 18

A $Li_7CuS_4$-LPS[70:30] mixed body of Example 18 was prepared in the same manner as in Example 2 except that the mixing ratio of the $Li_7CuS_4$ solid solution of Example 4 and LPS was $Li_7CuS_4$:LPS wt %=70:30 wt %, and a $Li_7CuS_4$-LPS(70:30) all-solid-state secondary battery was prepared using this mixed body by the same method as the above method for preparing the $Li_3CuS_2$ all-solid-state secondary battery. Using this $Li_7CuS_4$-LPS(70:30) all-solid-state secondary battery, the charge/discharge capacity was measured by repeating charging and discharging for five cycles.

The theoretical capacities, first charge capacities, and fifth discharge capacities of the $Li_3CuS_2$-LPS(70:30) all-solid-state secondary battery of Example 14, the $Li_8Cu_2S_5$-LPS (70:30) all-solid state-secondary battery of Example 16, the $Li_5CuS_3$-LPS(70:30) all-solid-state secondary battery of Example 17, and the $Li_7CuS_4$-LPS(70:30) all-solid-state secondary battery of Example 18 are shown in Table 3 below. Table 3 shows that the prepared all-solid-state secondary batteries have excellent charge/discharge capacities.

TABLE 3

| | Theoretical capacity/ mAh $g^{-1}$ | $1^{st}$ charge capacity/ mAh $g^{-1}$ | Utility ($1^{st}$ charge) | $5^{th}$ discharge capacity/ mAh $g^{-1}$ |
|---|---|---|---|---|
| $Li_3CuS_2$-LPS | 541 | 395 | 73% | 398 |
| $Li_8Cu_2S_5$-LPS | 625 | 427 | 68.3% | 411 |
| $Li_5CuS_3$-LPS | 689 | 427 | 62.0% | 411 |
| $Li_7CuS_4$-LPS | 780 | 206 | 26.4% | 150 |

(Preparation of $Li_5CuS_3$ Solid Solution with Substitution of LiI)

A $Li_{4.9}CuS_{2.9}I_{0.1}$ solid solution of Example 19 was prepared in the same manner as in Example 1 except that, in addition to $Li_2S$, Cu, and $S_5$, LiI was mixed at a molar ratio of $Li_2S$:Cu:S:LiI=24:10:5:1.

A $Li_{4.9}CuS_{2.9}I_{0.1}$-LPS[70:30] mixed body of Example 20 was prepared in the same manner as in Example 2 except that the mixing ratio of the $Li_{4.9}CuS_{2.9}I_{0.1}$ solid solution of Example 19 and LPS was $Li_{4.9}CuS_{2.9}I_{0.1}$:LPS wt %=70:30 wt %, and a $Li_{4.9}CuS_{2.9}I_{0.1}$-LPS(70:30) all-solid-state secondary battery was prepared using this mixed body by the same method as the above method for preparing the $Li_3CuS_2$ all-solid-state secondary battery.

Figure 23:
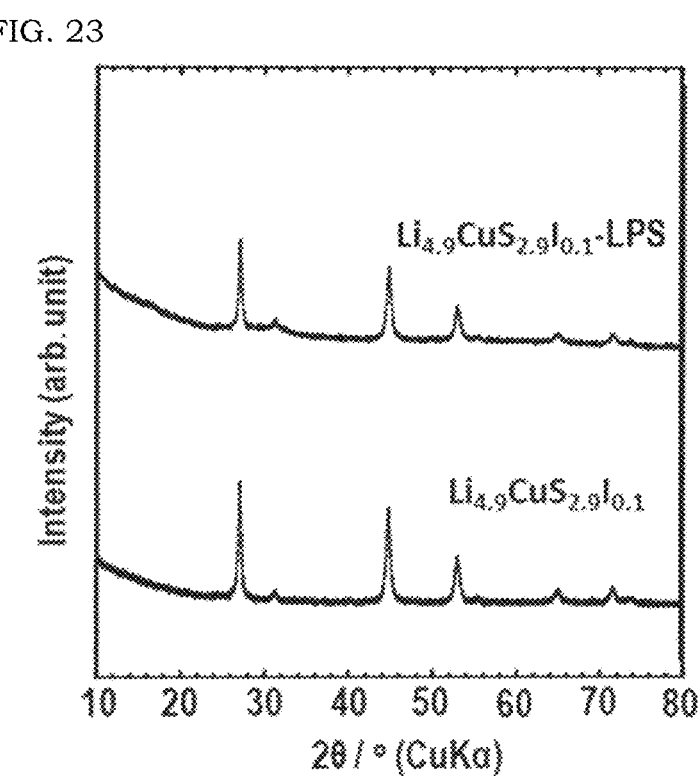
FIG. 23 shows XRD patterns of a $Li_{4.9}CuS_{2.9}I_{0.1}$ solid solution of Example 20 and a $Li_{4.9}CuS_{2.9}I_{0.1}$-LPS[70:30] mixed body of Example 21.
Figure 24:
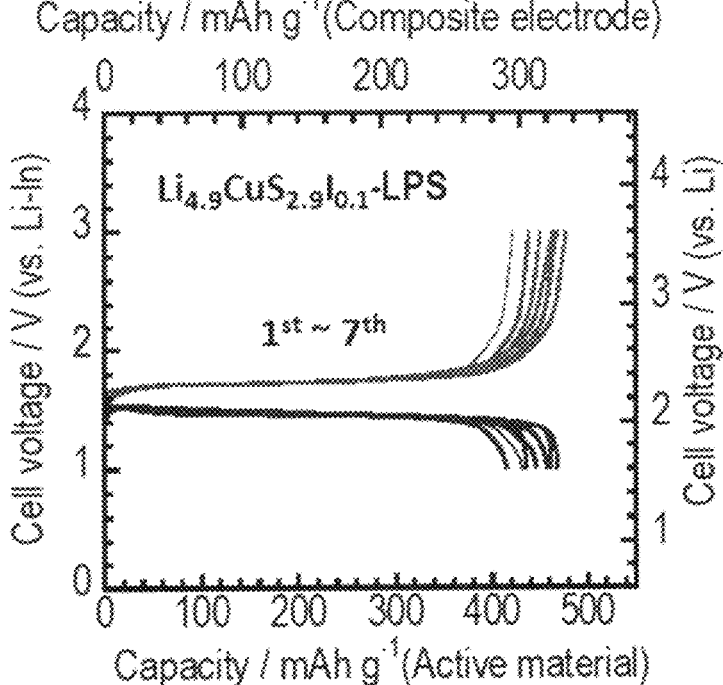
FIG. 24 shows charge/discharge curves obtained when a cycle test was performed on an all-solid-state battery using the $Li_{4.9}CuS_{2.9}I_{0.1}$-LPS[70:30] mixed body as an electrode active material.

The XRD patterns obtained from the $Li_{4.9}CuS_{2.9}I_{0.1}$ solid solution of Example 19 and the $Li_{4.9}CuS_{2.9}I_{0.1}$-LPS[70:30] mixed body of Example 20 are shown in FIG. 23. Using the $Li_{4.9}CuS_{2.9}I_{0.1}$(70:30) all-solid-state secondary battery of Example 20, the charge/discharge capacity was measured by repeating charging and discharging for seven cycles. The results are shown in FIG. 24. From FIG. 24, it can be seen that the prepared $Li_{4.9}CuS_{2.9}I_{0.1}$-LPS(70:30) all-solid-state secondary battery exhibits a high charge/discharge capacity of 350 mAh $g^{-1}$ or more.

From the above, it was found that the solid solution including Li, Cu, and S as main constituents of the present invention has an antifluorite crystal structure and can be used as an electrode of a secondary battery.

What is claimed is:

1. A solid solution with an antifluorite crystal structure comprising Li, Cu, and S as main constituents,
   wherein the solid solution is represented by the following formula (1):

$$Li_{4-x-y-z}Cu_{x-y}M_yS_{2-z}A_z \quad (1)$$

(where M is selected from Mg, Ca, Ni, Zn, Fe, Co, Sn, Pb, or Mn, A is a monovalent anion, x is 0.1 or more and 2.0 or less, y is more than 0 and less than 1.0, z is more than 0 and 1.0 or less, and x>y).

2. The solid solution according to claim 1, wherein x is in a range of 0.5 to 1.0 in the formula (1).

3. The solid solution according to claim 1, wherein y is more than 0 and less than 0.5 in the formula (1).

4. The solid solution according to claim 1, wherein z is more than 0 and 0.5 or less in the formula (1).

5. The solid solution according to claim 1, wherein the A is selected from F, Cl, Br, or I.

6. The solid solution according to claim 1, wherein a lattice constant of an a-axis of the solid solution is in a range of 5.60 Å to 5.80 Å.

7. An electrode active material comprising the solid solution according to claim 1.

8. The electrode active material according to claim 7, further comprising a solid electrolyte.

9. An electrode comprising the solid solution according to claim 1.

10. A secondary battery comprising the electrode according to claim 9.

11. The secondary battery according to claim 10, wherein the secondary battery is an all-solid-state secondary battery.

12. A mixed body of the solid solution according to claim 1, and at least one solid electrolyte selected from $Li_3PS_4$, $Li_7P_3S_{11}$, $Li_2S$—$P_2S_5$—$LiI$, $Li_2S$—$P_2S_5$—$LiI$—$LiBr$, $Li_2S$—$P_2S_5$—$Li_2O$, $Li_2S$—$P_2S_5$—$Li_2O$—$LiI$, and $Li_2S$—$P_2S_5$—$GeS_2$.

13. The mixed body according to claim 12, wherein the weight ratio of solid solution to solid electrolyte ranges from 1:1 to 7:3 (solid solution: solid electrolyte).

14. The mixed body according to claim 12, wherein the mixed body is in the form of composite.

15. An electrode active material comprising the mixed body according to claim 12.

16. An electrode comprising the electrode active material according to claim 7.

17. An electrode composite wherein the electrode according to claim 16 is combined with a current collector.

18. A secondary battery comprising the electrode composite according to claim 17.

\* \* \* \* \*